(12) United States Patent
Manda

(10) Patent No.: US 9,336,470 B2
(45) Date of Patent: May 10, 2016

(54) IMAGE FORMING APPARATUS, IMAGE FORMING METHOD, AND RECORDING MEDIUM THAT REDUCES LOAD FOR GENERATION OF TONE-CORRECTION DATA

(71) Applicant: Kyocera Document Solutions Inc., Osaka (JP)

(72) Inventor: Etsuko Manda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/689,056

(22) Filed: Apr. 17, 2015

(65) Prior Publication Data

US 2015/0302285 A1 Oct. 22, 2015

(30) Foreign Application Priority Data

Apr. 17, 2014 (JP) ................. 2014-085677

(51) Int. Cl.
G06K 15/02 (2006.01)
H04N 1/60 (2006.01)
B41J 29/393 (2006.01)

(52) U.S. Cl.
CPC ........... *G06K 15/1878* (2013.01); *B41J 29/393* (2013.01); *G06K 15/027* (2013.01); *H04N 1/6069* (2013.01)

(58) Field of Classification Search
CPC ............ G06K 15/1878; G06K 15/027; H04N 1/6075; H04N 1/6077; H04N 1/60
USPC .................. 358/1.9, 2.1, 501, 504, 518, 519; 382/167
See application file for complete search history.

(56) References Cited

U.S. PATENT DOCUMENTS

2008/0144060 A1* 6/2008 Ishikawa .............. H04N 1/6027
358/1.9

FOREIGN PATENT DOCUMENTS

JP 2009-302962 A 12/2009

* cited by examiner

*Primary Examiner* — Jamares Q Washington
(74) *Attorney, Agent, or Firm* — James W. Judge

(57) ABSTRACT

An image forming apparatus includes a print device, a spectral reflectance acquiring unit, and a tone-correction-data generation unit. The print device prints a chart including patches of a plurality of tones of color. The spectral reflectance acquiring unit acquires a spectral reflectance for the patches in the chart printed by the print device. The tone-correction-data generation unit generates tone-correction data for correction of tone characteristics of the print device. The tone-correction-data generation unit generates the tone-correction data based on the spectral reflectances in a range of specific partial wavelengths among the spectral reflectances in the range of whole wavelengths acquired by the spectral reflectance acquiring unit.

6 Claims, 18 Drawing Sheets

IMAGE FORMING APPARATUS, IMAGE FORMING METHOD, AND RECORDING MEDIUM THAT REDUCES LOAD FOR GENERATION OF TONE-CORRECTION DATA

INCORPORATION BY REFERENCE

This application is based upon, and claims the benefit of priority from, corresponding Japanese Patent Application No. 2014-085677 filed in the Japan Patent Office on Apr. 17, 2014, the entire contents of which are incorporated herein by reference.

BACKGROUND

Unless otherwise indicated herein, the description in this section is not prior art to the claims in this application and is not admitted to be prior art by inclusion in this section.

A typical image forming apparatus, such as a printer-only machine and a Multifunction Peripheral (MFP), has an input/output property that changes due to a cause such as a secular change. There is a known calibration method performing a correction of, so-called gamma correction, measuring a spectral reflectance of a patch included in a patch chart to obtain a correction value by using an integral sum of differences between the measured spectral reflectance and an ideal spectral reflectance.

SUMMARY

An image forming apparatus according to an aspect of the present disclosure includes a print device, a spectral reflectance acquiring unit, and a tone-correction-data generation unit. The print device prints a chart including patches of a plurality of tones of color. The spectral reflectance acquiring unit acquires a spectral reflectance for the patches in the chart printed by the print device. The tone-correction-data generation unit generates tone-correction data for correction of tone characteristics of the print device. The tone-correction-data generation unit generates the tone-correction data based on, among the spectral reflectances over the range of all of the wavelengths at which they are acquired by the spectral reflectance acquiring unit, the spectral reflectances over the ranges of specified portions of the wavelengths.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
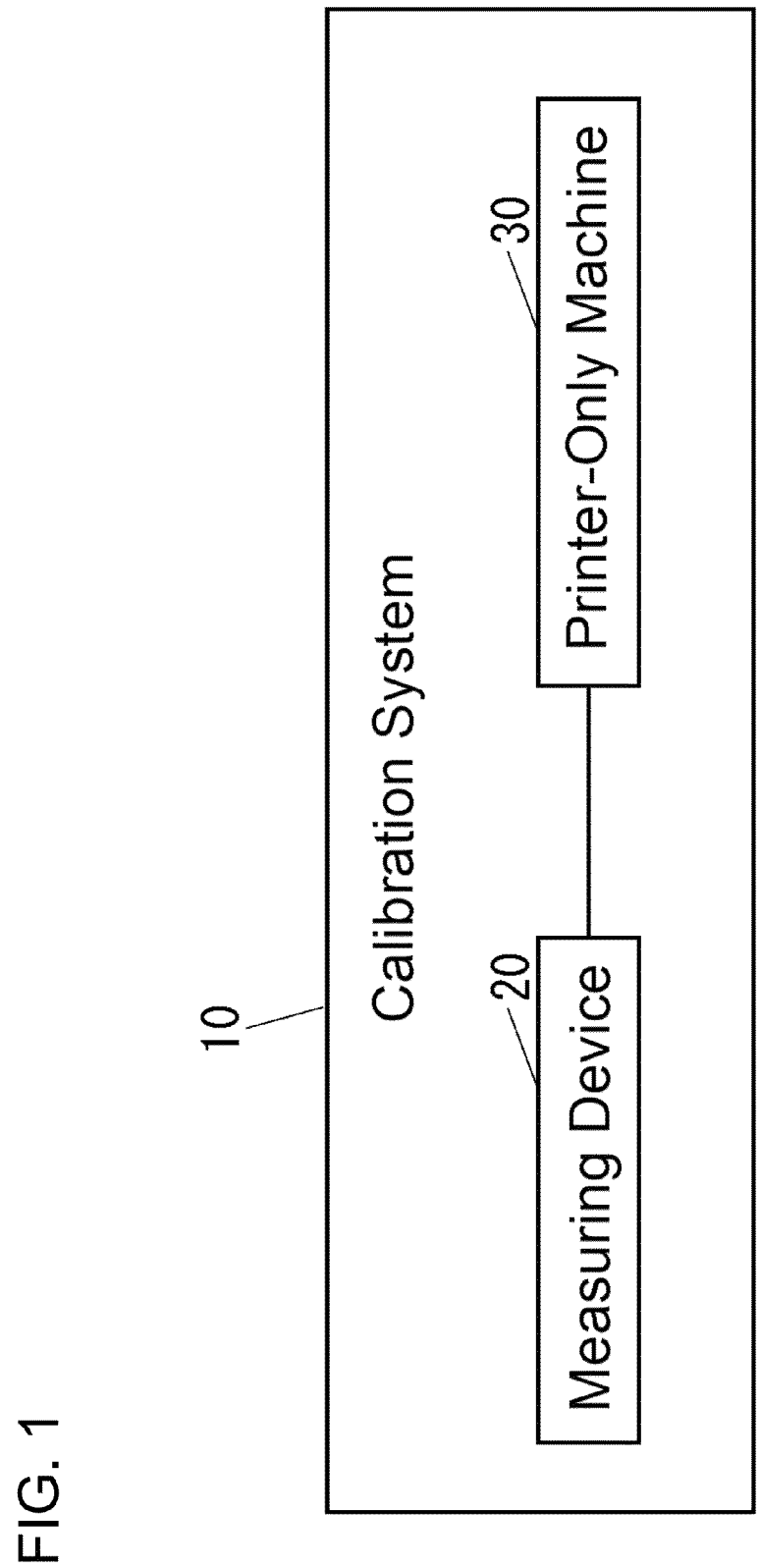
FIG. 1 is a schematic diagram illustrating a configuration of a calibration system according to one embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to drawings.

First, a description will be given of a configuration of a calibration system according to the embodiment.

FIG. 1 is a block diagram illustrating the configuration of a calibration system 10 according to the embodiment.

As illustrated in FIG. 1, the calibration system 10 includes a measuring device 20, which measures spectral reflectances of respective patches in a chart including the patches of a plurality of tones of color, and a printer-only machine 30 as an image forming apparatus. The measuring device 20 and the printer-only machine 30 are communicatively configured with one another. Here, the measuring device 20 may be capable of communicating with the printer-only machine 30 one another via a network such as a Local Area Network (LAN), or the Internet, or may even be directly capable of communicating with the printer-only machine 30 one another via a communication cable such as a Universal Serial Bus (USB) cable, not via the network.

The measuring device 20 can measure the spectral reflectances in a range of wavelengths of, for example, 380 nm to 730 nm.

Figure 2:
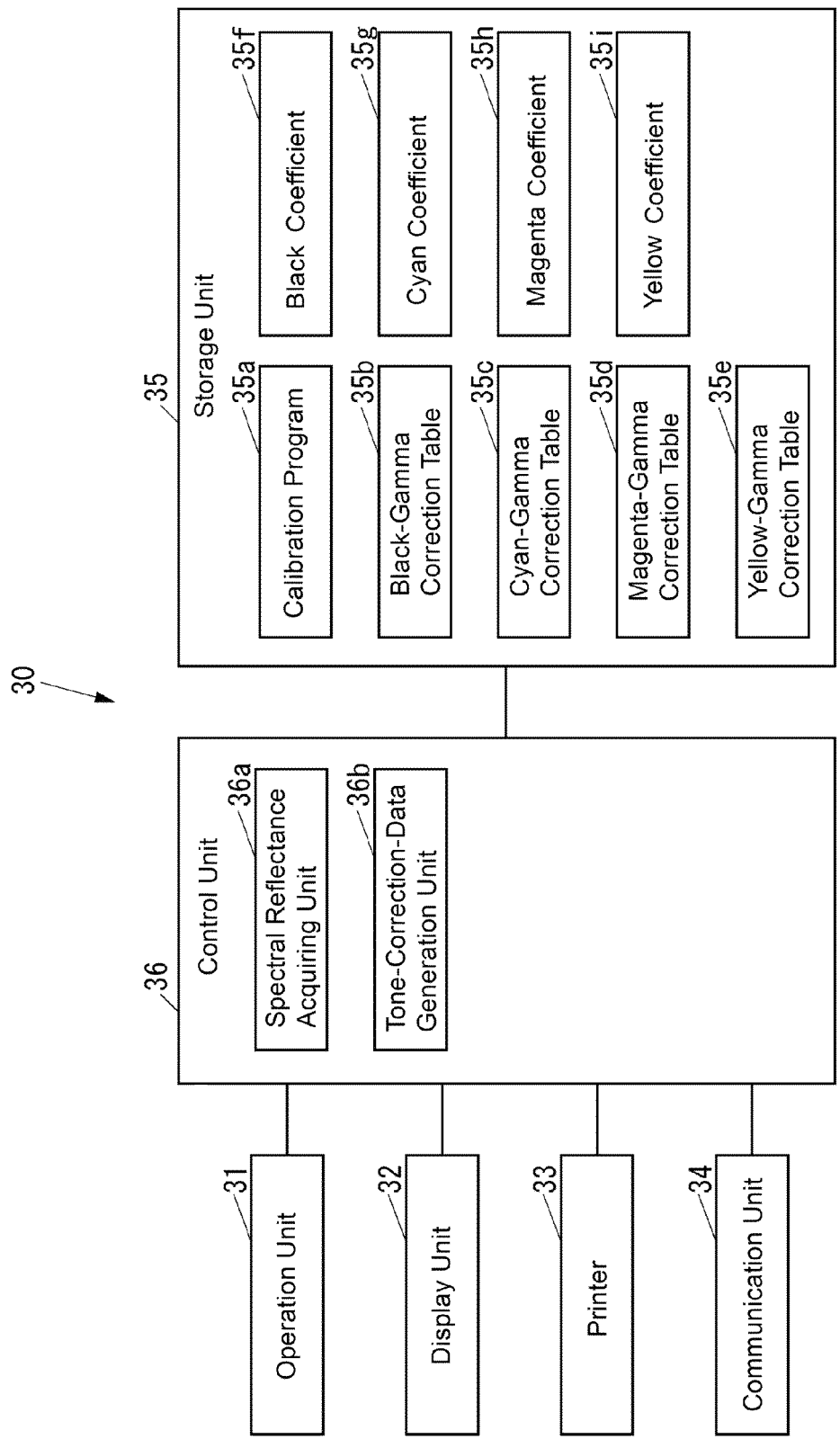
FIG. 2 is a schematic diagram illustrating a configuration of a printer-only machine according to the one embodiment.

FIG. 2 is a block diagram illustrating a configuration of the printer-only machine 30 according to the embodiment.

As illustrated in FIG. 2, the printer-only machine 30 includes an operation unit 31, a display unit 32, a printer 33, a communication unit 34, a storage unit 35, and a control unit 36 controlling the whole printer-only machine 30. The operation unit 31 is an input device such as buttons with which various operations are input. The display unit 32 is a display device such as a Liquid Crystal Display (LCD) displaying various kinds of information. The printer 33 is a print device that executes print job on a recording medium such as a paper sheet. The communication unit 34 is a communication device that communicates with an external device such as a Personal Computer (PC) and the measuring device 20 (see FIG. 1). The storage unit 35 is a non-volatile storage device, which is a non-transitory recording medium, such as an Electrically Erasable Programmable Read Only Memory (EEPROM) storing various data.

The storage unit 35 stores a calibration program 35a for correction of tone characteristics of the printer 33. The calibration program 35a may be installed in the printer-only machine 30 at production stage of the printer-only machine 30, or may be additionally installed in the printer-only machine 30 from a storage medium such as a SD card or a Universal Serial Bus (USB), or may be additionally installed in the printer-only machine 30 on the network.

The storage unit 35 can store: a black-gamma correction table 35b as tone-correction data for the correction of the tone characteristics of the printer 33 with regard to black, a cyan-gamma correction table 35c as tone-correction data for the correction of the tone characteristics of the printer 33 with regard to cyan, a magenta-gamma correction table 35d as tone-correction data for the correction of the tone characteristics of the printer 33 with regard to magenta, and a yellow-gamma correction table 35e as tone-correction data for the correction of the tone characteristics of the printer 33 with regard to yellow.

The storage unit 35 stores: a black coefficient 35f used for generation of the black-gamma correction table 35b, a cyan coefficient 35g used for generation of the cyan-gamma correction table 35c, a magenta coefficient 35h used for generation of the magenta-gamma correction table 35d, and a yellow coefficient 35i used for generation of the yellow-gamma correction table 35e.

The control unit 36 includes, for example, a Central Processing Unit (CPU), a Read Only Memory (ROM) storing programs and various kinds of data, and a Random Access Memory (RAM) used as a work area for the CPU. The CPU executes the programs stored in the ROM or the storage unit 35.

The control unit 36 functions as a spectral reflectance acquiring unit 36a and a tone-correction-data generation unit 36b by executing the calibration program 35a stored in the storage unit 35. The spectral reflectance acquiring unit 36a acquires the spectral reflectances measured by the measuring device 20 (see FIG. 1) with respect to the patches in the chart, which include the patches of the plurality of tones of color and are printed by the printer 33. The tone-correction-data generation unit 36b generates the black-gamma correction table 35b, the cyan-gamma correction table 35c, the magenta-gamma correction table 35d, and the yellow-gamma correction table 35e.

Next, a description will be given of a calculation method of the black coefficient 35f.

When generating the black-gamma correction table 35b, the larger a range width (difference between a chromaticity value of the minimum tone and a chromaticity value of the maximum tone) of a value for generation of the black-gamma correction table 35b is, the smaller an error in normalization becomes as described below. Accordingly, a Y value where a change (range width) is large in a XYZ colorimetric system should be noted with regard to black. Here, the Y value is obtained based on the spectral reflectances of black measured by the measuring device 20, a color matching function y ($\lambda$) in the XYZ colorimetric system, and a spectral distribution R ($\lambda$) of a light source of the measuring device 20. Then, the Y value is significantly affected by the color matching function y ($\lambda$) among the spectral reflectances of black measured by the measuring device 20, the color matching function y ($\lambda$), and the spectral distribution R ($\lambda$). Thus, a wavelength range from 520 nm to 580 nm, where the color matching function y ($\lambda$) is large, that is, the change of the Y value is large, should be noted with regard to black.

Accordingly, a coefficient rev (Bk, $\lambda$) as the black coefficient 35f is expressed as indicated by Formula 1 based on the color matching function y ($\lambda$) in the XYZ colorimetric system, and the spectral distribution R ($\lambda$) of the light source of the measuring device 20. Here, $\lambda$ and $\lambda a$ denote the wavelength. Furthermore, $\lambda$ and $\lambda a$ range from 520 nm to 580 nm in Formula 1. That is, the black coefficient 35f is obtained by a value of multiplication of the color matching function y ($\lambda$) and the spectral distribution R ($\lambda$) being transformed in order that a range of the value shall be from 0 to 1.

$$rev(Bk, \lambda) = \frac{y(\lambda) \times R(\lambda)}{\max[y(\lambda_a) \times R(\lambda_a)]} \qquad \text{Formula 1}$$

In practice, it is sufficient that only the black coefficient 35f corresponding to the wavelength used for generation of the black-gamma correction table 35b is stored in the storage unit 35. For example, it is sufficient that only seven kinds of the black coefficients 35f, which correspond to $\lambda$: 520 nm, 530 nm, 540 nm, 550 nm, 560 nm, 570 nm, and 580 nm, are stored in the storage unit 35.

Next, a description will be given of a calculation method of the cyan coefficient 35g.

When generating the cyan-gamma correction table 35c, the larger the range width (difference between a chromaticity value of the minimum tone and a chromaticity value of the maximum tone) of a value for the generation of the cyan-gamma correction table 35c is, the smaller the error in normalization becomes as described below. Accordingly, an X value where the change (range width) is large in the XYZ colorimetric system should be noted with regard to cyan. Here, the X value is obtained based on the spectral reflectances of cyan measured by the measuring device 20, a color matching function x (λ) in the XYZ colorimetric system, and the spectral distribution R (λ) of the light source of the measuring device 20. Then, the X value is significantly affected by the color matching function x (λ) among the spectral reflectances of cyan measured by the measuring device 20, the color matching function x (λ), and the spectral distribution R (λ). Thus, a wavelength range from 570 nm to 630 nm, where the color matching function x (λ) is large, that is, the change of the X value is large, should be noted.

Accordingly, a coefficient rev (Cy, λ) as the cyan coefficient 35g is expressed as indicated by Formula 2 based on the color matching function x (λ) in the XYZ colorimetric system, and the spectral distribution R (λ). Furthermore, λ and λa range from 570 nm to 630 nm in Formula 2. That is, the cyan coefficient 35g is obtained by a value of multiplication of the color matching function x (λ) and the spectral distribution R (λ) being transformed in order that a range of the value shall be from 0 to 1.

$$rev(Cy, \lambda) = \frac{x(\lambda) \times R(\lambda)}{\max[x(\lambda_a) \times R(\lambda_a)]} \quad \text{Formula 2}$$

In practice, it is sufficient that only the cyan coefficient 35g corresponding to the wavelength used for the generation of the cyan-gamma correction table 35c is stored in the storage unit 35. For example, it is sufficient that only seven kinds of the cyan coefficients 35g, which correspond to λ of 570 nm, 580 nm, 590 nm, 600 nm, 610 nm, 620 nm, and 630 nm, are stored in the storage unit 35.

Next, a description will be given of a calculation method of the magenta coefficient 35h.

When generating the magenta-gamma correction table 35d, the larger the range width (difference between a chromaticity value of the minimum tone and a chromaticity value of the maximum tone) of a value for the generation of the magenta-gamma correction table 35d is, the smaller the error in normalization becomes as described below. Accordingly, the Y value where the change (range width) is large in the XYZ colorimetric system should be noted with regard to magenta. Here, the Y value is obtained based on the spectral reflectances of magenta measured by the measuring device 20, the color matching function y (λ) in the XYZ colorimetric system, and the spectral distribution R (λ) of the light source of the measuring device 20. Then, the Y value is significantly affected by the color matching function y (λ) among the spectral reflectances of magenta measured by the measuring device 20, the color matching function y (λ), and the spectral distribution R (λ). Thus, a range of wavelengths from 520 nm to 580 nm, where the color matching function y (λ) is large, that is, the change of the Y value is large, should be noted with regard to magenta.

Accordingly, a coefficient rev (Mg, λ) as the magenta coefficient 35h is expressed as indicated by Formula 3 based on the color matching function y (λ), and the spectral distribution R (λ). Furthermore, λ and λa range from 520 nm to 580 nm in Formula 3. That is, the magenta coefficient 35h, similarly to the black coefficient 35f, is obtained by the value of multiplication of the color matching function y (λ) and the spectral distribution R (λ) being transformed in order that the range of the value shall be from 0 to 1.

$$rev(Mg, \lambda) = \frac{y(\lambda) \times R(\lambda)}{\max[y(\lambda_a) \times R(\lambda_a)]} \quad \text{Formula 3}$$

In practice, it is sufficient that only the magenta coefficient 35h corresponding to the wavelength used for generation of the magenta-gamma correction table 35d is stored in the storage unit 35. For example, it is sufficient that only seven kinds of the magenta coefficients 35h, which correspond to λ: 520 nm, 530 nm, 540 nm, 550 nm, 560 nm, 570 nm, and 580 nm, are stored in the storage unit 35.

Next, a description will be given of a calculation method of the yellow coefficient 35i.

When generating the yellow-gamma correction table 35e, the larger the range width (difference between a chromaticity value of the minimum tone and a chromaticity value of the maximum tone) of a value for the generation of the yellow-gamma correction table 35e is, the smaller the error in normalization becomes as described below. Accordingly, a Z value where the change (range width) is large in the XYZ colorimetric system should be noted with regard to yellow. Here, the Z value is obtained based on the spectral reflectances of yellow measured by the measuring device 20, a color matching function z (λ) in the XYZ colorimetric system, and the spectral distribution R (λ) of the light source of the measuring device 20. Then, the Z value is significantly affected by the color matching function z (λ) among the spectral reflectances of yellow measured by the measuring device 20, the color matching function z (λ), and the spectral distribution R (λ). Thus, a wavelength range from 420 nm to 480 nm, where the color matching function z (λ) is large, that is, the change of the Z value is large, should be noted with regard to yellow.

Accordingly, a coefficient rev (Ye, λ) as the yellow coefficient 35i is expressed as indicated by Formula 4 based on the color matching function z (λ) in the XYZ colorimetric system, and the spectral distribution R (λ). Furthermore, λ and λa range from 420 nm to 480 nm in Formula 4. That is, the yellow coefficient 35i is obtained by the value of multiplication of the color matching function z (λ) and the spectral distribution R (λ) being transformed in order that the range of the value shall be from 0 to 1.

$$rev(Ye, \lambda) = \frac{z(\lambda) \times R(\lambda)}{\max[z(\lambda_a) \times R(\lambda_a)]} \quad \text{Formula 4}$$

In practice, it is sufficient that only the yellow coefficient 35i corresponding to the wavelength used for the generation of the yellow-gamma correction table 35e is stored in the storage unit 35. For example, it is sufficient that only seven kinds of the yellow coefficients 35i, which correspond to λ: 420 nm, 430 nm, 440 nm, 450 nm, 460 nm, 470 nm, and 480 nm, are stored in the storage unit 35.

Next, a description will be given of a calibration method according to the embodiment.

First, the control unit 36 of the printer-only machine 30 executes the calibration program 35a stored in the storage unit 35, corresponding to an instruction accepted via the operation unit 31 or the communication unit 34. Thus, the printer-only machine 30 prints the chart by the printer 33 on the storage medium.

Here, the chart is configured with the patches of the several tones with respect to each of black, cyan, magenta, and yellow. In the following, assume that the chart is configured with the patches of the 64 tones with respect to each of black, cyan, magenta, and yellow. That is, when the printer 33 can print, for example, by 256 tones indicated by tone values of 0 to 255 for each of black, cyan, magenta, and yellow, assume that the chart is configured with the patches of 64 tones indicated by the equally spaced tone values, such as the tone values of 3, 7, 11, . . . , 251, 255. Here, assume that the larger the tone value is, the darker a print density is.

Furthermore, the chart includes a plurality of patches for each tone with respect to each of black, cyan, magenta and yellow, and the patches are arranged at positions selected by random numbers, that is, at random positions. Due to various influences such as the print job by the printer 33 and the measurement by the measuring device 20, for example, an in-plane non-uniformity, by which the patches located at an end in the chart becomes darker than an ideal state, or similar fault, occurs. However, since the chart includes the plurality of patches for each tone with respect to each of black, cyan, magenta, and yellow, and the patches are arranged at the random positions, the spectral reflectances measured by the measuring device 20 are averaged for each tone of each color. Thus, the influence such as in-plane non-uniformity may hardly affect the generation of the black-gamma correction table 35b, the cyan-gamma correction table 35c, the magenta-gamma correction table 35d, and the yellow-gamma correction table 35e. In the following, assume that the chart includes four patches for each tone with respect to each of black, cyan, magenta, and yellow. That is, with 64 tones worth with respect to each of black, cyan, magenta, and yellow, and four patches for each tone, namely, total 1024 patches are randomly arranged in the chart.

Figure 3:
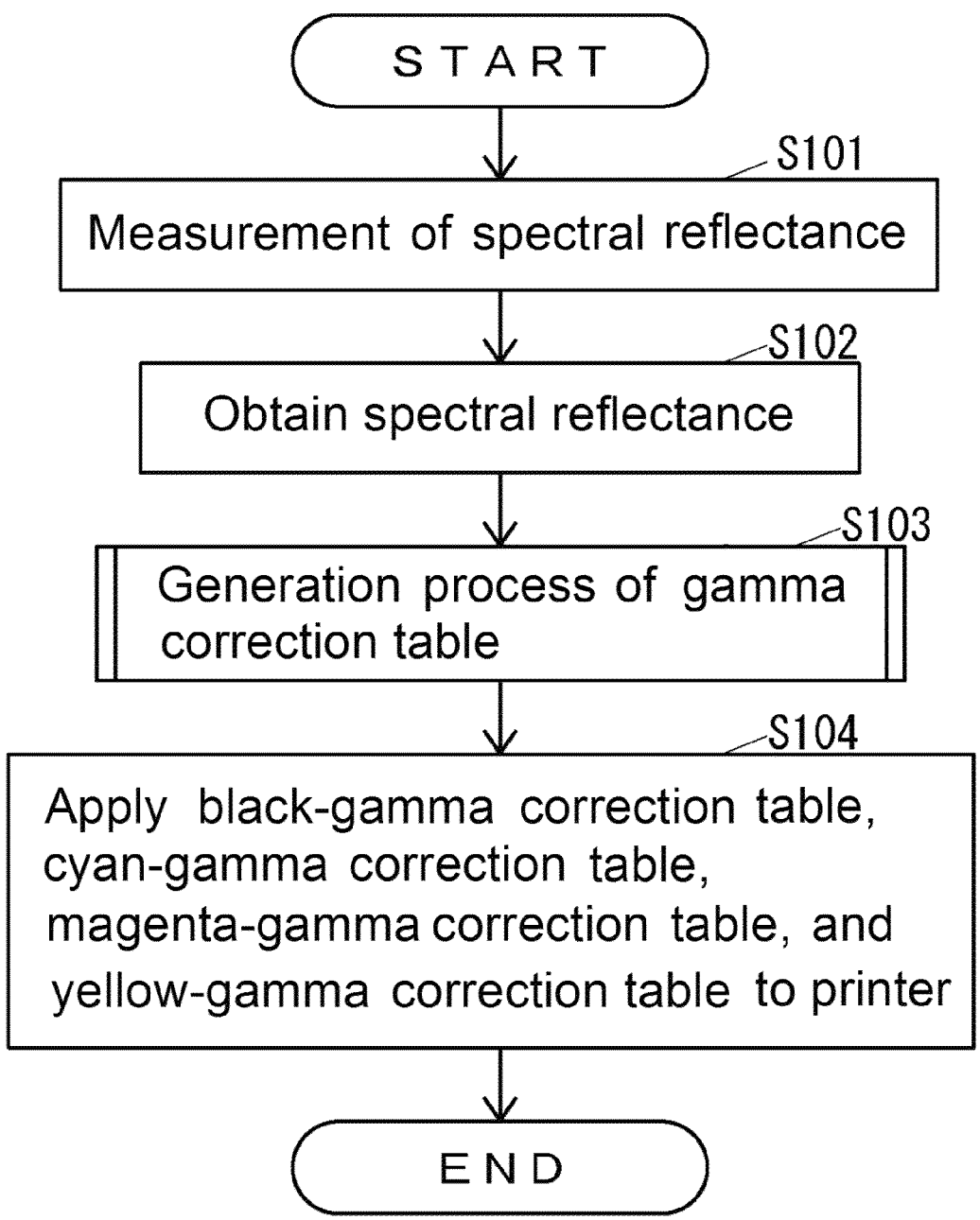
FIG. 3 is a flowchart of an operation of the printer-only machine according to the one embodiment when executing a calibration.

Next, the control unit 36, which corresponds to the instruction accepted via the operation unit 31 or the communication unit 34, executes an operation illustrated in FIG. 3 by executing the calibration program 35a stored in the storage unit 35.

FIG. 3 is a flowchart of the operation of the printer-only machine 30 when executing calibration.

As illustrated in FIG. 3, after the spectral reflectance acquiring unit 36a of the control unit 36 causes the measuring device 20 to measure the spectral reflectance of each patch of the chart printed on the storage medium by the printer 33 (Step S101), the spectral reflectance acquiring unit 36a of the control unit 36 obtains the spectral reflectances measured at Step S101 for each tone with respect to each of black, cyan, magenta, and yellow (Step S102). Here, using information of an arrangement of the patches randomly generated when generating the chart, the spectral reflectance acquiring unit 36a can obtain the spectral reflectances from the measuring device 20 by identification of whether the spectral reflectance is any of color of black, cyan, magenta, and yellow and is any of tone of patch. The process of S102 obtains 64 tones worth with respect to each of black, cyan, magenta, and yellow, and four patches for each tone, that is, total 1024 spectral reflectances.

The tone-correction-data generation unit 36b of the control unit 36 executes the generation process of the gamma correction table generating the black-gamma correction table 35b, the cyan-gamma correction table 35c, the magenta-gamma correction table 35d, and the yellow-gamma correction table 35e after the process of S102 (Step S103).

Figure 4:
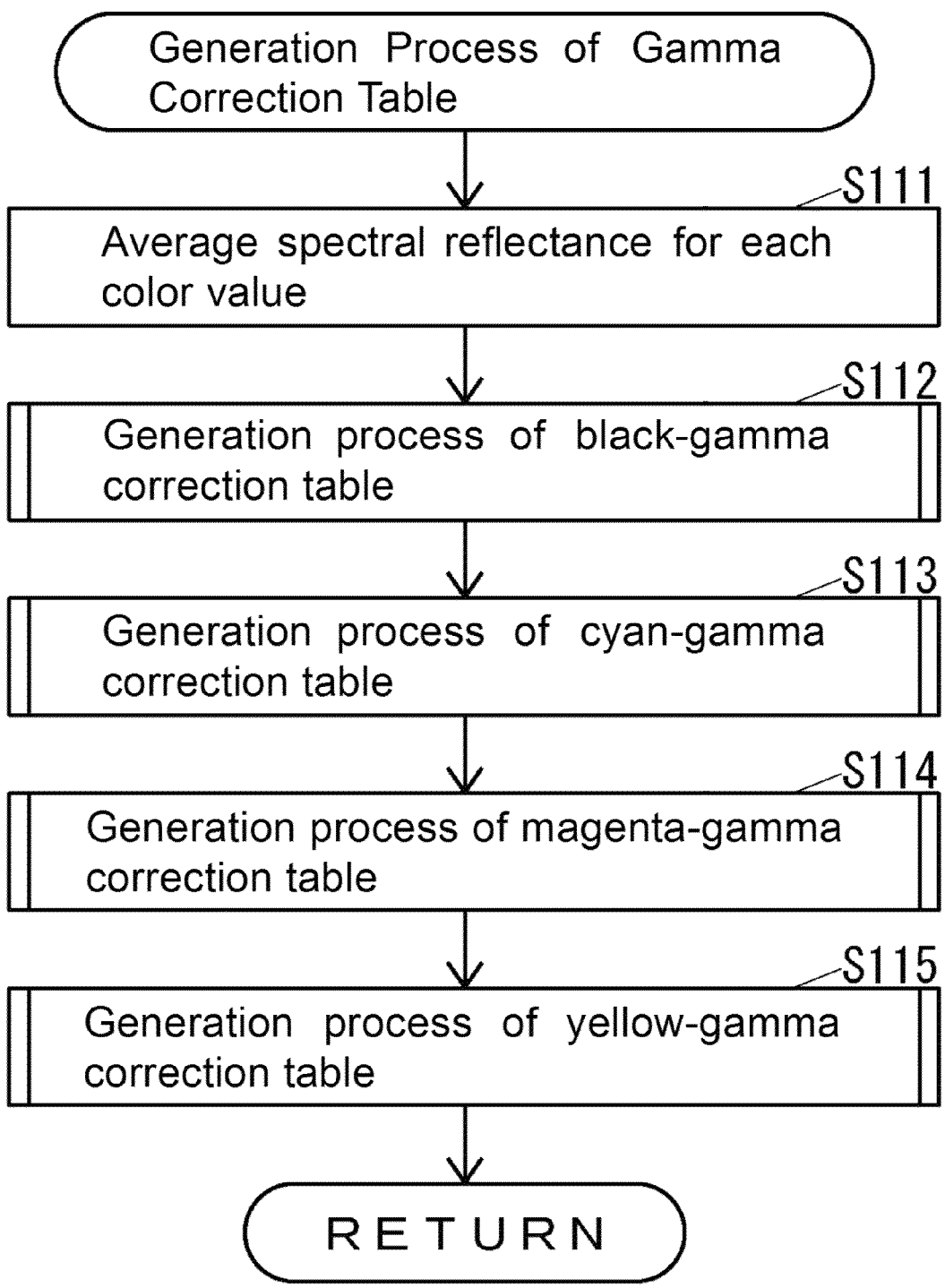
FIG. 4 is a flowchart of a generation process of a gamma correction table according to the one embodiment.

FIG. 4 is a flow chart of the generation process of the gamma correction table illustrated in FIG. 3.

As illustrated in FIG. 4, the tone-correction-data generation unit 36b averages the spectral reflectances obtained at Step S102 for each tone, namely, for each color value with respect to each of black, cyan, magenta, and yellow (Step S111). The process of S111 generates 64 tones worth with respect to each of black, cyan, magenta, and yellow, namely, total 256 spectral reflectances.

Next, the tone-correction-data generation unit 36b executes the generation process of a black-gamma correction table for generating the black-gamma correction table 35b (Step S112).

Figure 5:
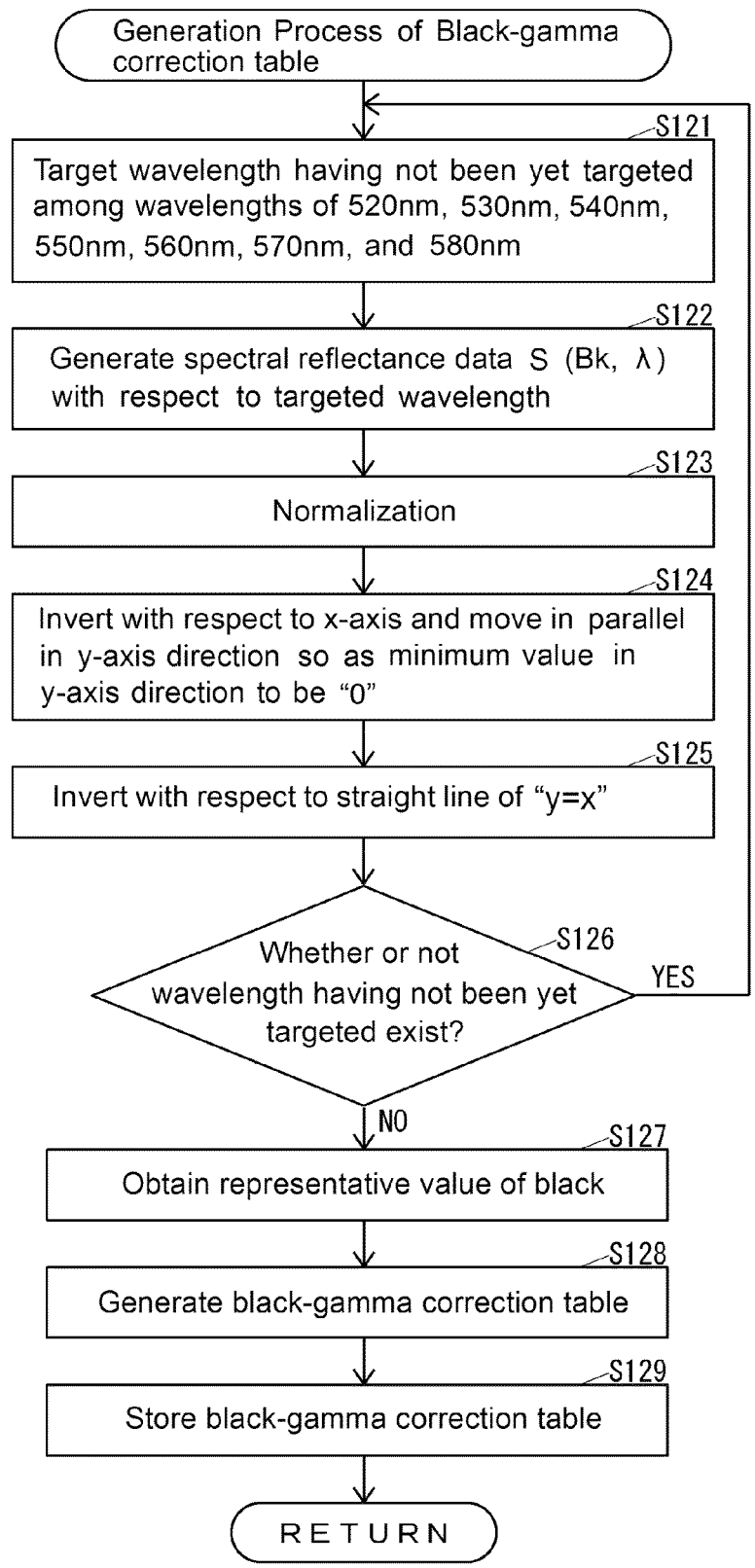
FIG. 5 is a flowchart of a generation process of a black-gamma correction table illustrated in FIG. 4.

FIG. 5 is a flowchart of the generation process of the black-gamma correction table illustrated in FIG. 4.

As illustrated in FIG. 5, the tone-correction-data generation unit 36b targets the wavelength that has not been yet targeted among the wavelengths of 520 nm, 530 nm, 540 nm, 550 nm, 560 nm, 570 nm, and 580 nm used for the generation of the black-gamma correction table 35b in the range of wavelengths of above-described 520 nm to 580 nm (Step S121).

Figure 6A:
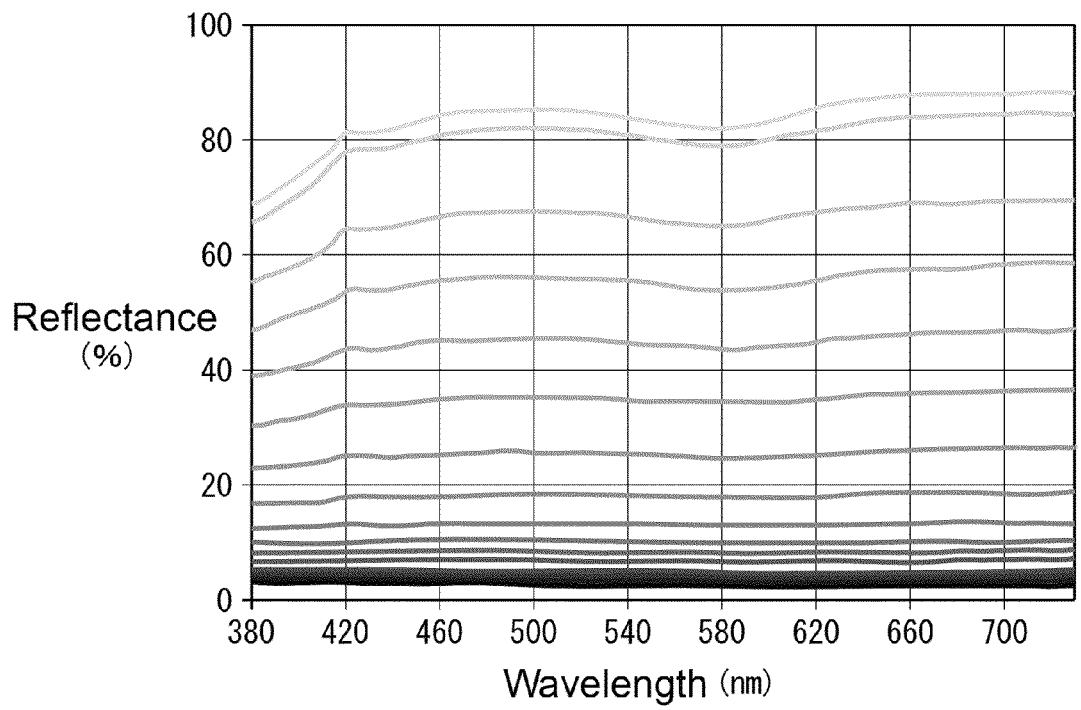
FIG. 6A is a graph illustrating spectral reflectances of 16 tones worth among the spectral reflectances of black averaged in the process illustrated in FIG. 4.

FIG. 6A illustrates the spectral reflectances of 16 tones worth among the spectral reflectances of black averaged at Step S111.

Though the spectral reflectances of black averaged at Step S111 are 64 tones worth, only the spectral reflectances of 16 tones worth, which are indicated by the tone values of 15, 31, 47, 63, 79, 95, 111, 127, 143, 159, 175, 191, 207, 223, 239, and 255 among the spectral reflectances of 64 tones worth, are illustrated in FIG. 6A so as to improve visibility. In FIG. 6A, the spectral reflectance with larger tone value is illustrated by a darker line of print density.

As illustrated in FIG. 6A, the wavelength range of 520 nm to 580 nm is the range where the change of spectral reflectance relative to the change of the tone of black is large compared with, for example, the range adjacent to the wavelength of 380 nm.

The tone-correction-data generation unit 36b, after the process of S121, generates spectral reflectance data S (Bk, λ) indicating the spectral reflectance relative to the tone value with respect to the current targeted wavelength in the spectral reflectances of black averaged at Step S111 (Step S122).

Figure 6B:
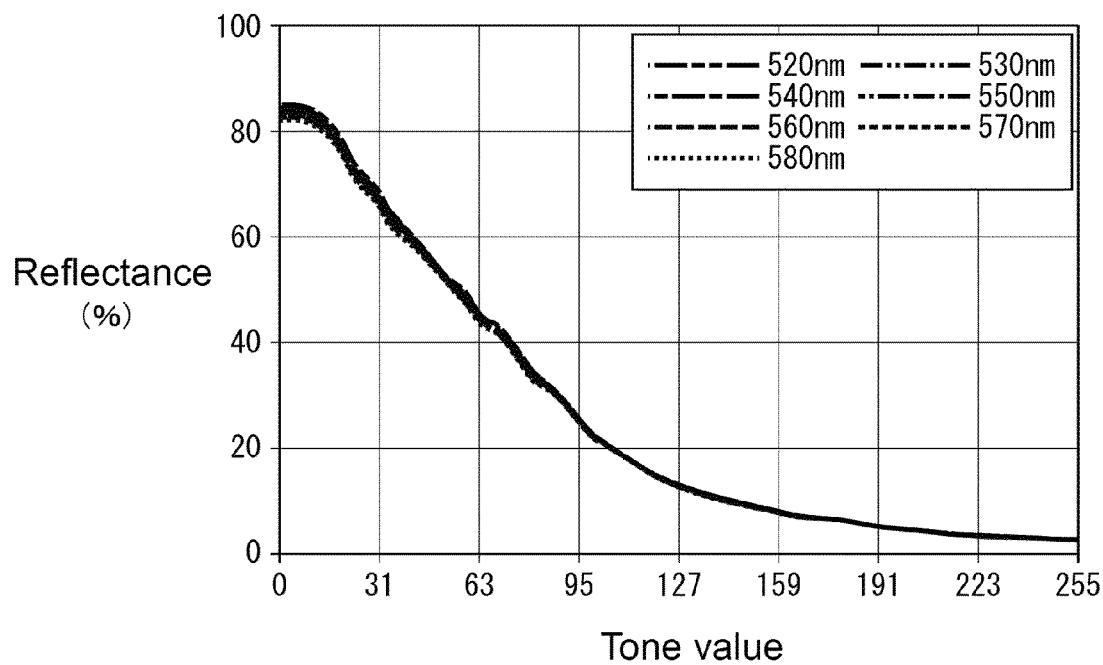
FIG. 6B is a graph illustrating spectral reflectance data S (Bk, λ) generated in the process illustrated in FIG. 5.

FIG. 6B illustrates the spectral reflectance data S (Bk, λ) generated at Step S122.

In FIG. 6B, the spectral reflectance data S (Bk, 520 nm), the spectral reflectance data S (Bk, 530 nm), the spectral reflectance data S (Bk, 540 nm), the spectral reflectance data S (Bk, 550 nm), the spectral reflectance data S (Bk, 560 nm), the spectral reflectance data S (Bk, 570 nm), and the spectral reflectance data S (Bk, 580 nm) are illustrated. Though a graph illustrated in FIG. 6B is drawn as a continuous line, in practice, the graph is a set of points of 64 tones worth used in the process.

Figure 7:
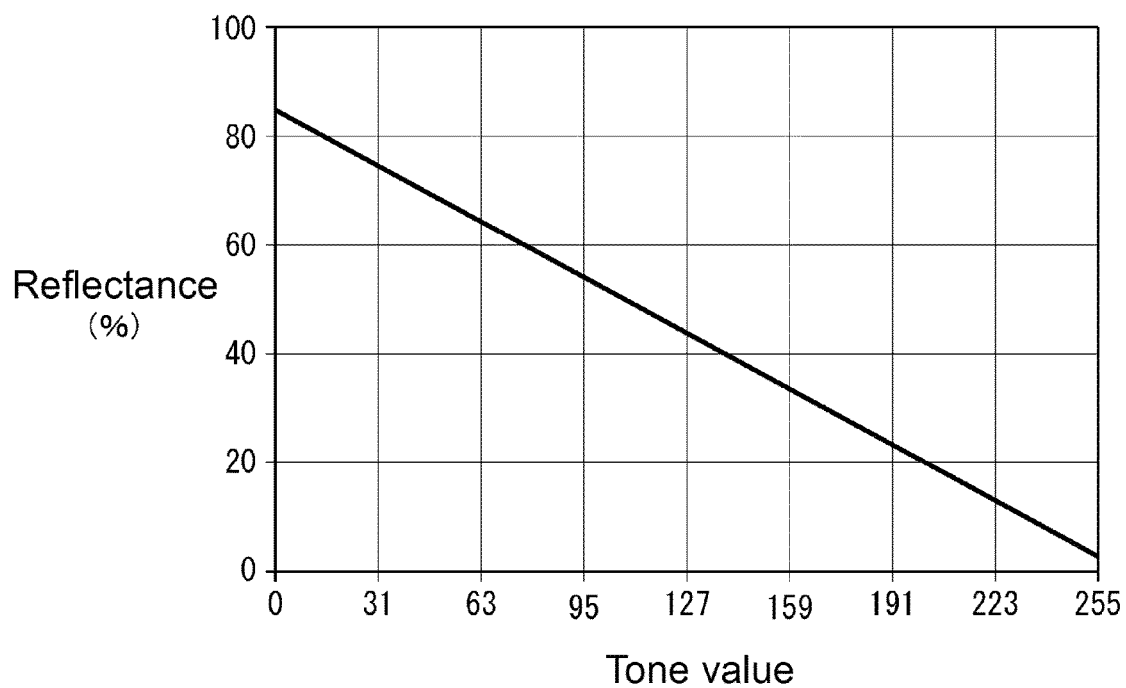
FIG. 7 is a graph illustrating an example of targeted tone characteristics for black in the printer according to the one embodiment.

FIG. 7 illustrates an example of the tone characteristics targeted for black in the printer 33.

In the embodiment, a linear tone characteristics illustrated in FIG. 7 is ideal for the tone characteristics of black in the printer 33.

As illustrated in FIG. 5, the tone-correction-data generation unit 36b, after the process of S122, normalizes the spectral reflectance data S (Bk, λ) in order that the range shall be from 0 to 255 as expressed in Formula 5 (Step S123). Here, in Formula 5, ref (Bk, max) denotes the maximum spectral reflectance in the tone characteristics illustrated in FIG. 7. Additionally, ref (Bk, min) denotes the minimum spectral reflectance in the tone characteristics illustrated in FIG. 7.

$$S_a(Bk, \lambda) = \frac{S(Bk, \lambda) - ref(Bk, \min)}{ref(Bk, \max) - ref(Bk, \min)} \times 255 \quad \text{Formula 5}$$

Figure 8A:
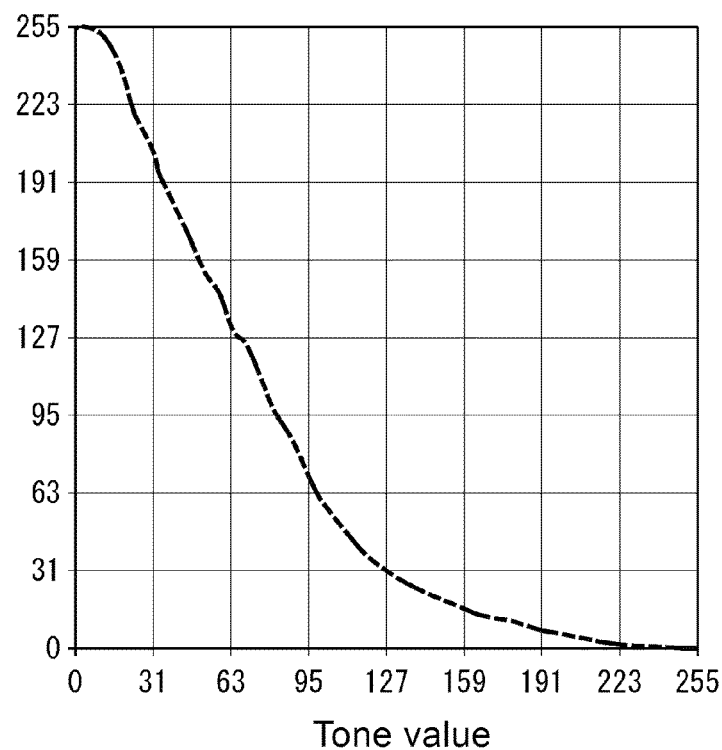
FIG. 8A is a graph illustrating Sa (Bk, 520 nm) generated in the process illustrated in FIG. 5.

FIG. 8A illustrates Sa (Bk, 520 nm) generated at Step S123.

S (Bk, 520 nm) illustrated in FIG. 6B is transformed to Sa (Bk, 520 nm) illustrated in FIG. 8A by the process of S123.

As illustrated in FIG. 5, the tone-correction-data generation unit 36b, after the process of S123, inverts Sa (Bk, λ) obtained at Step S123 with respect to x-axis and moves S (Bk, λ) in parallel in a y-axis direction in order that a minimum value in the y-axis direction shall be "0" as expressed in Formula 6 (Step S124).

$$S_b(Bk,\lambda)=255-S_a(Bk,\lambda) \quad \text{Formula 6}$$

Figure 8B:
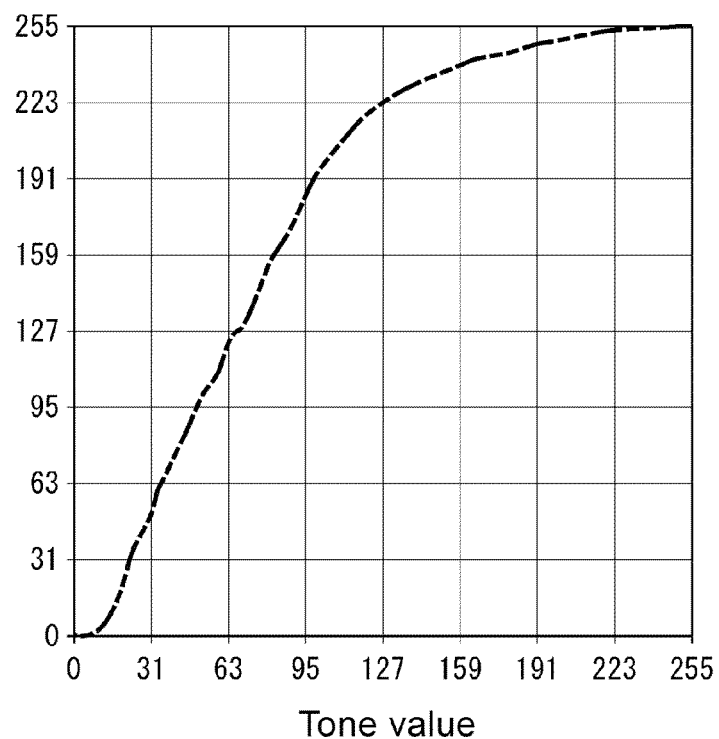
FIG. 8B is a graph illustrating Sb (Bk, 520 nm) generated in the process illustrated in FIG. 5.

FIG. 8B illustrates Sb (Bk, 520 nm) generated at Step S124.

Sa (Bk, 520 nm) illustrated in FIG. 8A is transformed to Sb (Bk, 520 nm) illustrated in FIG. 8B by the process of S124.

As illustrated in FIG. 5, the tone-correction-data generation unit 36b, after the process of S124, inverts Sb (Bk, λ) obtained at Step S124 with respect to a straight line of "y=x" as expressed in Formula 7 (Step S125).

$$T(Bk,\lambda)=S_b^{-1}(Bk,\lambda) \quad \text{Formula 7}$$

Figure 9A:
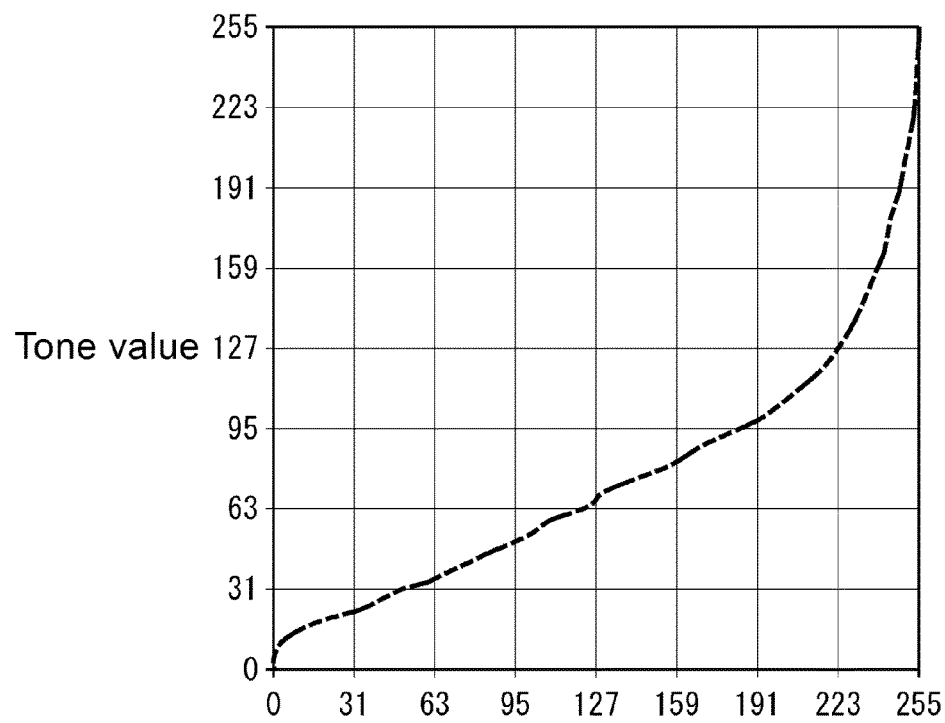
FIG. 9A is a graph illustrating T (Bk, 520 nm) generated in the process illustrated in FIG. 5.

FIG. 9A illustrates T (Bk, 520 nm) generated at Step S125.

Sb (Bk, 520 nm) illustrated in FIG. 8B is transformed to T (Bk, 520 nm) illustrated in FIG. 9A by the process of S125.

As illustrated in FIG. 5, the tone-correction-data generation unit 36b, after the process of S125, determines whether or not the wavelength, which has not been yet targeted, exists among the wavelengths of 520 nm, 530 nm, 540 nm, 550 nm, 560 nm, 570 nm, and 580 nm (Step S126).

When the tone-correction-data generation unit 36b determines that the wavelength having not been yet targeted exists at Step S126, the tone-correction-data generation unit 36b executes the process of S121.

When the tone-correction-data generation unit 36b determines that the wavelength having not been yet targeted does not exist at Step S126, the tone-correction-data generation unit 36b obtains a representative value of black central (Bk) by multiplying T (Bk, λ) obtained at Step S125 by the black coefficient 35f stored in the storage unit 35 for each wavelength, and then obtaining the average as expressed in Formula 8 (Step S127).

$$\begin{aligned}
\text{central}(Bk) = \quad & \text{Formula 8} \\
(T(Bk, 520 \text{ nm}) \times rev(Bk, 520 \text{ nm}) + T(Bk, 530 \text{ nm}) \times \\
rev(Bk, 530 \text{ nm}) + T(Bk, 540 \text{ nm}) \times rev(Bk, 540 \text{ nm}) + \\
T(Bk, 550 \text{ nm}) \times rev(Bk, 550 \text{ nm}) + \\
T(Bk, 560 \text{ nm}) \times rev(Bk, 560 \text{ nm}) + \\
T(Bk, 570 \text{ nm}) \times rev(Bk, 570 \text{ nm}) + \\
T(Bk, 580 \text{ nm}) \times rev(Bk, 580 \text{ nm})) \div 7
\end{aligned}$$

Figure 9B:
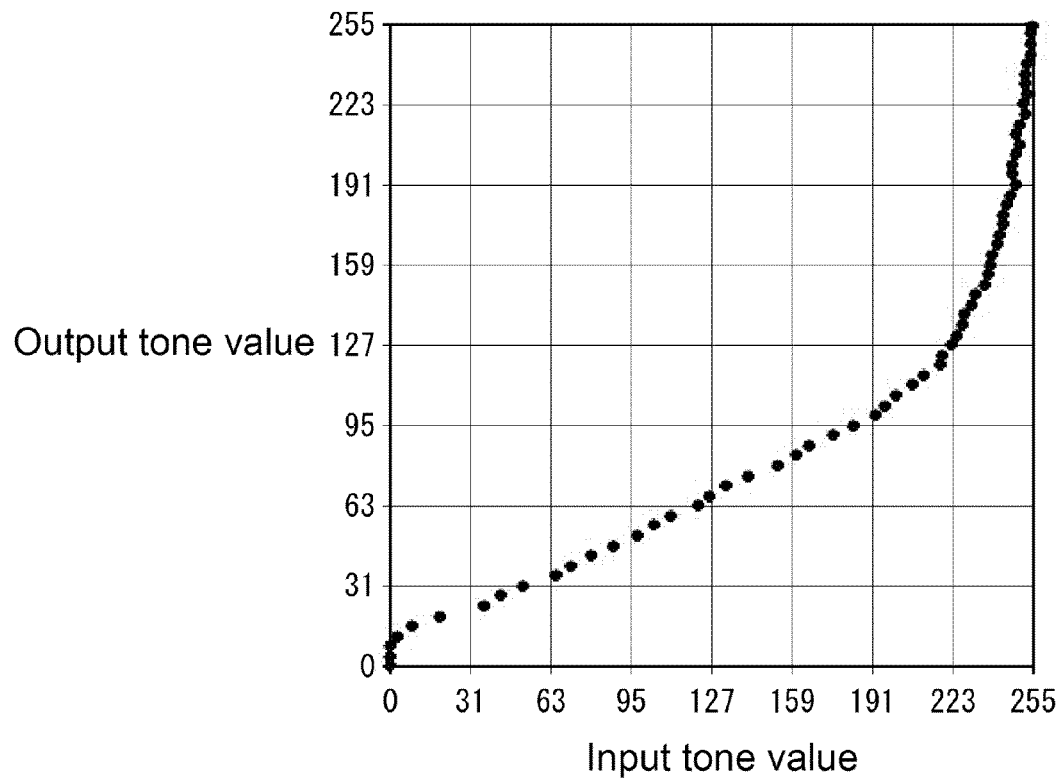
FIG. 9B is a graph illustrating a central (Bk) generated in the process illustrated in FIG. 5.

FIG. 9B illustrates a central (Bk) generated at Step S127.

As illustrated in FIG. 9B, the central (Bk) generated by the process of S127 is configured by the representative values of 64 tones indicating an output tone value relative to a input tone value.

As illustrated in FIG. 5, the tone-correction-data generation unit 36b, after the process of S127, generates the black-gamma correction table 35b by increasing the representative values of 64 points of the central (Bk) to 256 points (Step S128). Here, as a method of increase of the representative values 64 points to 256 points, various methods, for example such as a first-order approximation, a second-order approximation, and a spline interpolation, may be employed.

The tone-correction-data generation unit 36b, after the process of S128, causes the black-gamma correction table 35b generated at Step S128 to be stored in the storage unit 35 (Step S129) and terminates the generation process of the black-gamma correction table illustrated in FIG. 5.

As illustrated in FIG. 4, the tone-correction-data generation unit 36b executes a generation process of the cyan-gamma correction table generating the cyan-gamma correction table 35c (Step S113) when the generation process of the black-gamma correction table at Step S112 is terminated.

Figure 10:
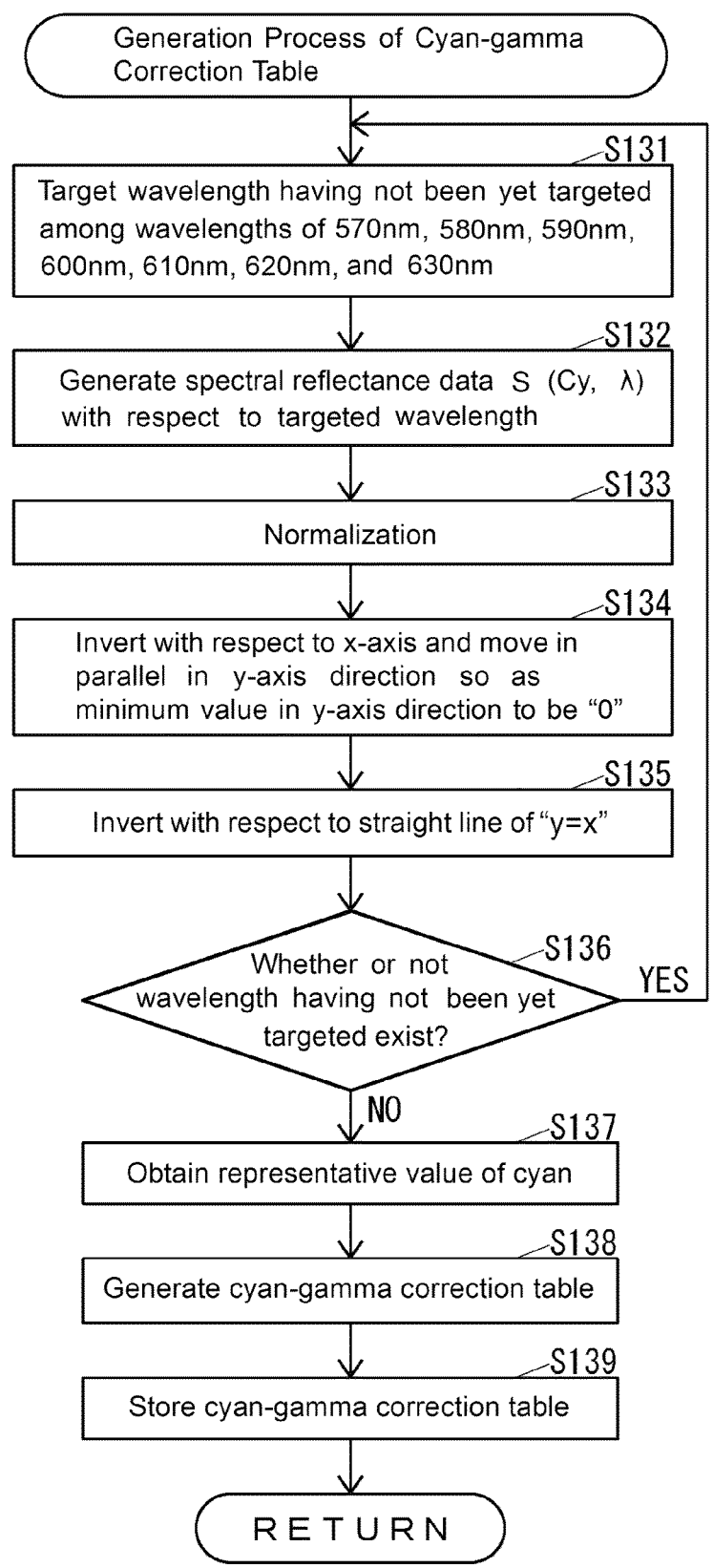
FIG. 10 is a flowchart of a generation process of a cyan-gamma correction table illustrated in FIG. 4.

FIG. 10 is a flowchart of the generation process of the cyan-gamma correction table illustrated in FIG. 4.

As illustrated in FIG. 10, the tone-correction-data generation unit 36b targets the wavelength having not been yet targeted among the wavelengths of 570 nm, 580 nm, 590 nm, 600 nm, 610 nm, 620 nm, and 630 nm used for the generation of the cyan-gamma correction table 35c in the wavelength range of above-described 570 nm to 630 nm (Step S131).

Figure 11A:
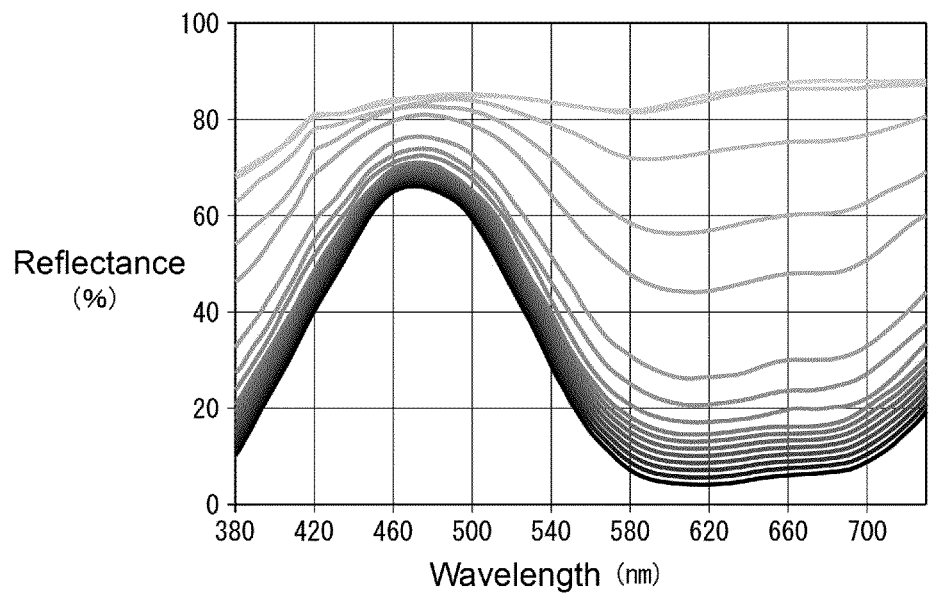
FIG. 11A is a graph illustrating the spectral reflectances of 16 tones worth among the spectral reflectances of cyan averaged in the process illustrated in FIG. 4.

FIG. 11A illustrates the spectral reflectances of 16 tones worth among the spectral reflectances of cyan averaged at Step S111.

Though the spectral reflectances of cyan averaged at Step S111 are 64 tones worth, only the spectral reflectances of 16 tones worth, which are indicated by the tone values of 15, 31, 47, 63, 79, 95, 111, 127, 143, 159, 175, 191, 207, 223, 239, and 255 among the spectral reflectances of 64 tones worth, are illustrated in FIG. 11A so as to improve visibility. In FIG. 11A, the spectral reflectance with larger tone value is illustrated by a darker line of print density.

As illustrated in FIG. 11A, the range of wavelengths of 570 nm to 630 nm is the range where the change of spectral reflectance relative to the change of the tone of cyan is large compared with, for example, the range of wavelengths of 380 nm to 540 nm.

The tone-correction-data generation unit 36b, after the process of S131, generates the spectral reflectance data S (Cy, λ) indicating the spectral reflectance relative to the tone value with respect to the current targeted wavelength, in the spectral reflectances of cyan averaged at Step S111 (Step S132).

Figure 11B:
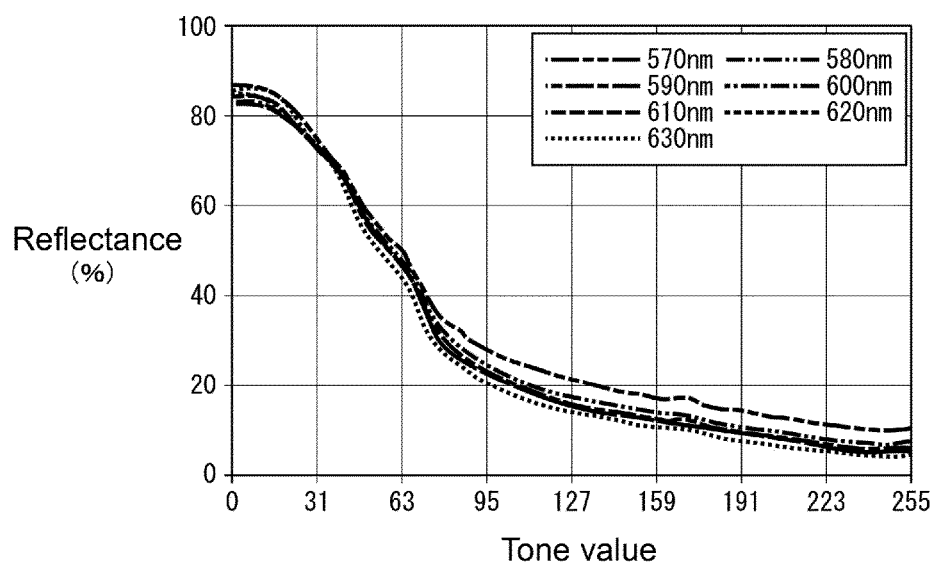
FIG. 11B is a graph illustrating a spectral reflectance S (Cy, λ) generated in the process illustrated in FIG. 10.

FIG. 11B illustrates the spectral reflectance data S (Cy, λ) generated at Step S132.

In FIG. 11B, the spectral reflectance data S (Cy, 570 nm), the spectral reflectance data S (Cy, 580 nm), the spectral reflectance data S (Cy, 590 nm), the spectral reflectance data S (Cy, 600 nm), the spectral reflectance data S (Cy, 610 nm), the spectral reflectance data S (Cy, 620 nm), and the spectral reflectance data S (Cy, 630 nm) are illustrated. Though a graph illustrated in FIG. 11B is drawn as a continuous line, in practice, the graph is the set of points of 64 tones worth used in the process.

As illustrated in FIG. 10, the tone-correction-data generation unit 36b, after the process of S132, executes the process of S133 similarly to the process of S123, using the maximum spectral reflectance ref (Cy, max) and the minimum spectral reflectance ref (Cy, min) in the targeted tone characteristics of cyan in the printer 33.

Next, the tone-correction-data generation unit 36b executes the processes of S134 and S135, similarly to the processes of S124 and S125.

The tone-correction-data generation unit 36b, after the process of S135, determines whether or not the wavelength, which has not been yet targeted, exists among the wavelengths of 570 nm, 580 nm, 590 nm, 600 nm, 610 nm, 620 nm, and 630 nm (Step S136).

When the tone-correction-data generation unit 36b determines that the wavelength having not been yet targeted exists at Step S136, the tone-correction-data generation unit 36b executes the process of S131.

When the tone-correction-data generation unit 36b determines that the wavelength having not been yet targeted does not exist at Step S136, the tone-correction-data generation unit 36b obtains a representative value of cyan central (Cy) by multiplying T (Cy, λ) obtained at Step S135 by the cyan coefficient 35g stored in the storage unit 35 for each wavelength, and then obtaining the average, similarly to the process of S127 (Step S137).

Figure 12:
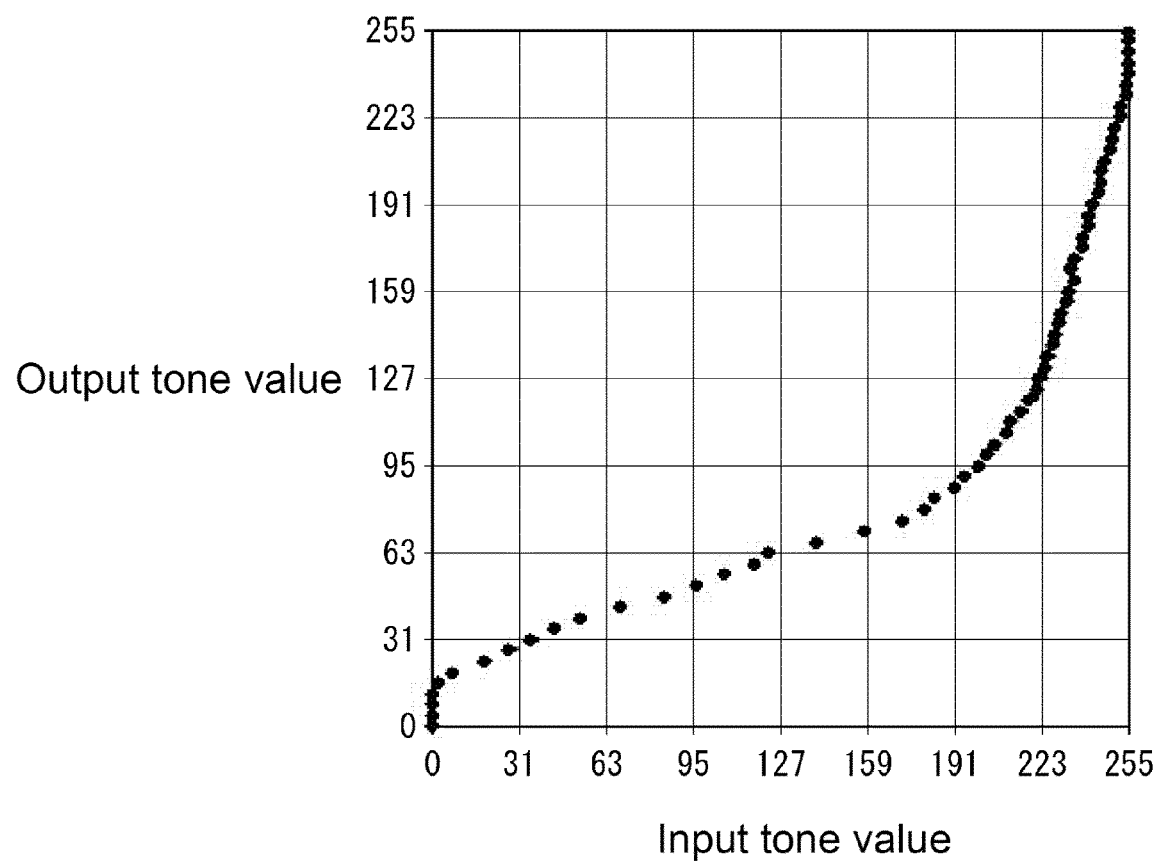
FIG. 12 is a graph illustrating a central (Cy) generated in the process illustrated in FIG. 10.

FIG. 12 illustrates a central (Cy) generated at Step S137.

As illustrated in FIG. 12, the central (Cy) generated by the process of S137 is configured by the representative values of the 64 tones indicating the output tone value relative to the input tone value.

As illustrated in FIG. 10, the tone-correction-data generation unit 36b, after the process of S137, generates the cyan-gamma correction table 35c by increasing the representative values of 64 points of the central (Cy) to 256 points, similarly to the process of S128 (Step S138).

The tone-correction-data generation unit 36b, after the process of S138, causes the cyan-gamma correction table 35c generated at Step S138 to be stored in the storage unit 35 (Step S139) and terminates the generation process of the cyan-gamma correction table illustrated in FIG. 10.

As illustrated in FIG. 4, the tone-correction-data generation unit 36b executes a generation process of the magenta-gamma correction table for generating the magenta-gamma correction table 35d (Step S114) when the generation process of the cyan-gamma correction table at Step S113 is terminated.

Figure 13:
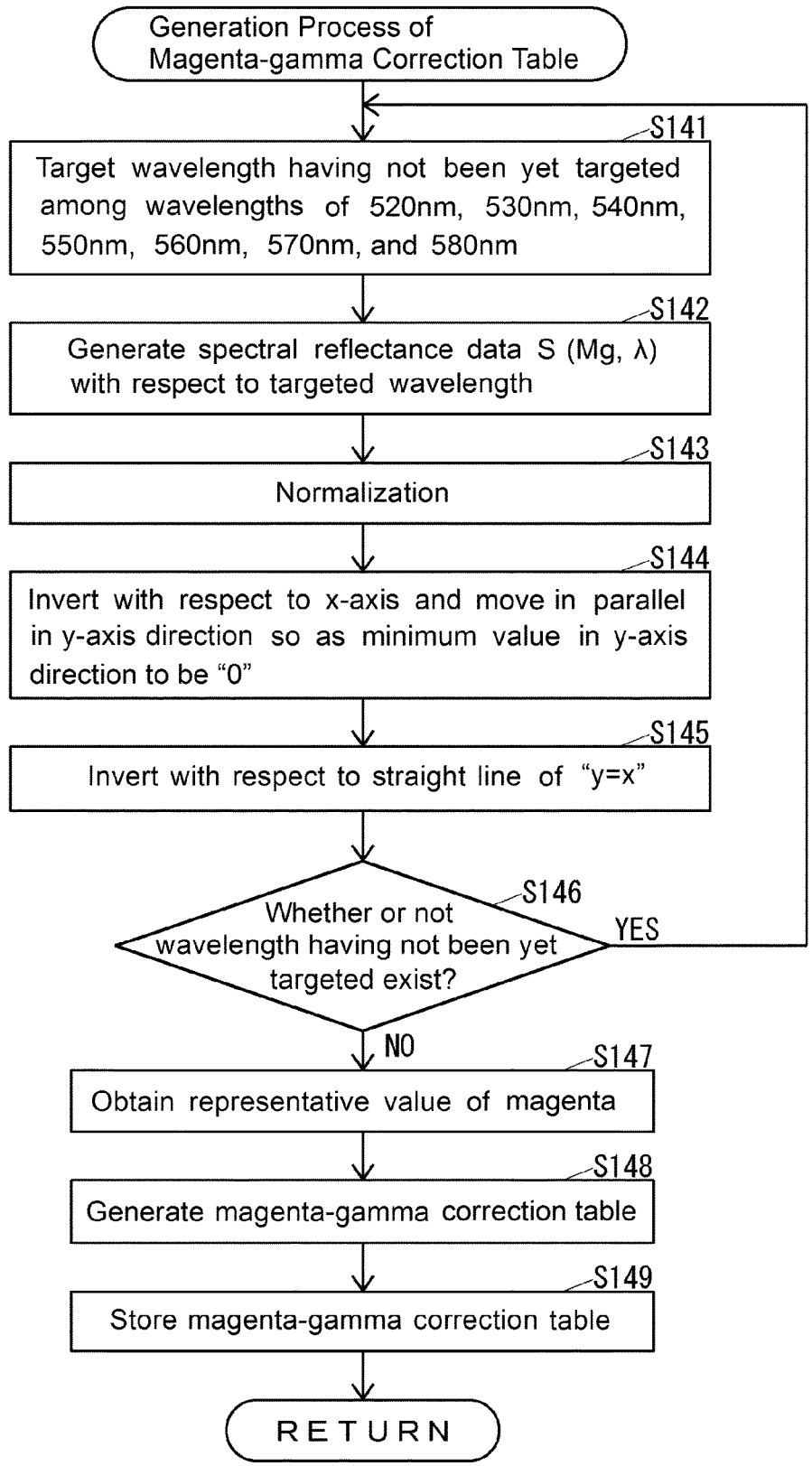
FIG. 13 is a flowchart of a generation process of a magenta-gamma correction table illustrated in FIG. 4.

FIG. 13 is a flowchart of the generation process of the magenta-gamma correction table illustrated in FIG. 4.

As illustrated in FIG. 13, the tone-correction-data generation unit 36b targets the wavelength having not been yet targeted among the wavelengths of 520 nm, 530 nm, 540 nm, 550 nm, 560 nm, 570 nm, and 580 nm used for the generation of the magenta-gamma correction table 35d in the range of wavelengths of above-described 520 nm to 580 nm (Step S141).

Figure 14A:
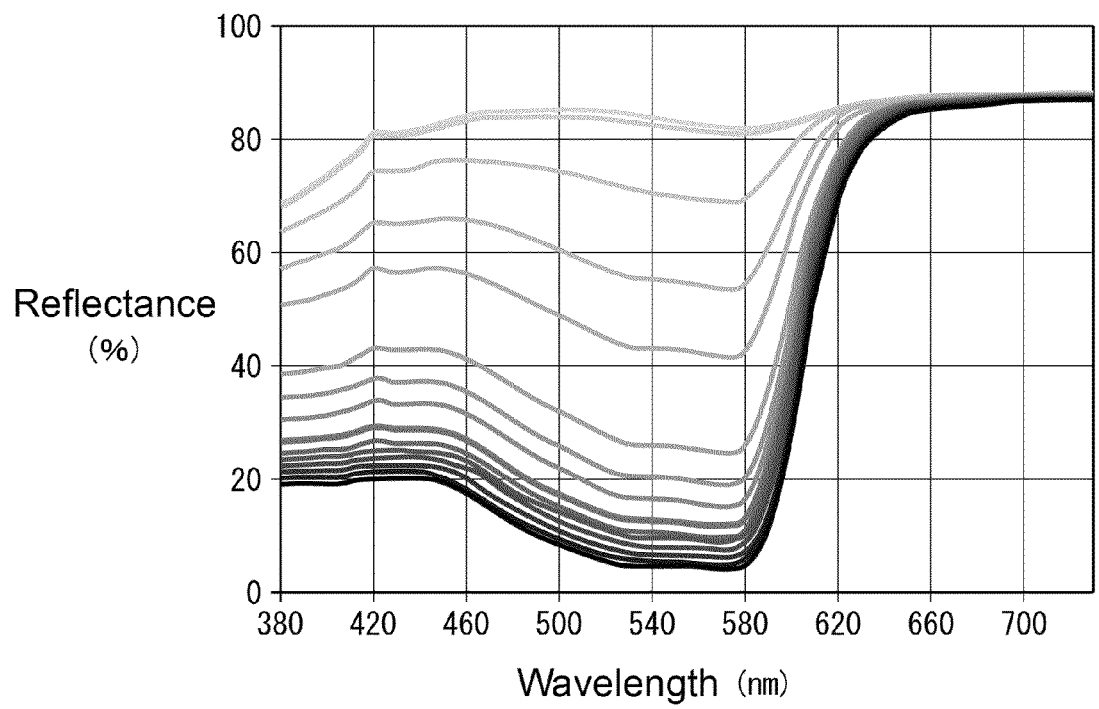
FIG. 14A is a graph illustrating the spectral reflectances of 16 tones worth among the spectral reflectances of magenta averaged in the process illustrated in FIG. 4.

FIG. 14A illustrates the spectral reflectances of 16 tones worth among the spectral reflectances of magenta averaged at Step S111.

Though the spectral reflectances of magenta averaged at Step S111 are 64 tones worth, only the spectral reflectances of 16 tones worth, which are indicated by the tone values of 15, 31, 47, 63, 79, 95, 111, 127, 143, 159, 175, 191, 207, 223, 239, and 255 among the spectral reflectances of 64 tones worth, are illustrated in FIG. 14A so as to improve visibility. In FIG. 14A, the spectral reflectance with larger tone value is illustrated by a darker line of print density.

As illustrated in FIG. 14A, the range of wavelengths of 520 nm to 580 nm is the range where the change of spectral reflectance relative to the change of the tone of magenta is large compared with, for example, the range of the wavelengths of 380 nm to 460 nm and the range of the wavelengths of 620 nm to 730 nm.

The tone-correction-data generation unit 36b, after the process of S141, generates the spectral reflectance data S (Mg, λ) indicating the spectral reflectance relative to the tone value with respect to the current targeted wavelength, in the spectral reflectances of magenta averaged at Step S111 (Step S142).

Figure 14B:
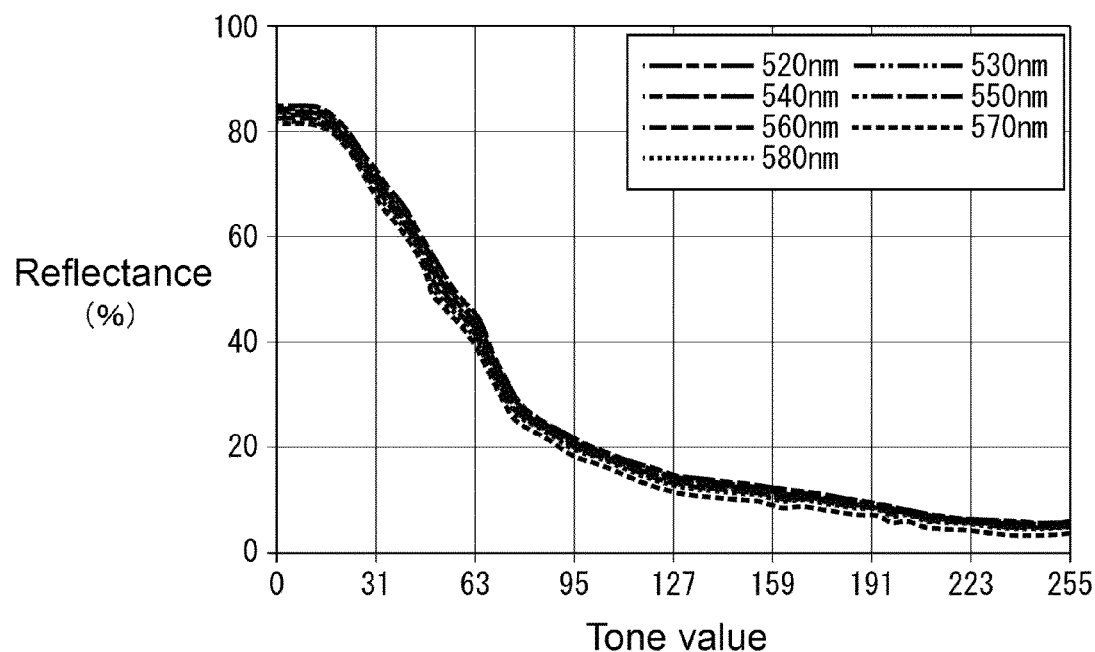
FIG. 14B is a graph illustrating a spectral reflectance S (Mg, λ) generated in the process illustrated in FIG. 13.

FIG. 14B illustrates the spectral reflectance data S (Mg, λ) generated at Step S142.

In FIG. 14B, the spectral reflectance data S (Mg, 520 nm), the spectral reflectance data S (Mg, 530 nm), the spectral reflectance data S (Mg, 540 nm), the spectral reflectance data S (Mg, 550 nm), the spectral reflectance data S (Mg, 560 nm), the spectral reflectance data S (Mg, 570 nm), and the spectral reflectance data S (Mg, 580 nm) are illustrated. Though a graph illustrated in FIG. 14B is drawn as a continuous line, in practice, the graph is the set of points of 64 tones worth used in the process.

As illustrated in FIG. 13, the tone-correction-data generation unit 36b, after the process of S142, executes the process of S143 similarly to the process of S123, using the maximum spectral reflectance ref (Mg, max) and the minimum spectral reflectance ref (Mg, min) in the tone targeted characteristics of magenta in the printer 33.

Next, the tone-correction-data generation unit 36b executes the processes of S144 and S145, similarly to the processes of S124 and S125.

The tone-correction-data generation unit 36b, after the process of S145, determines whether or not the wavelength, which has not been yet targeted, exists among the wavelengths of 520 nm, 530 nm, 540 nm, 550 nm, 560 nm, 570 nm, and 580 nm (Step S146).

When the tone-correction-data generation unit 36b determines that the wavelength having not been yet targeted exists at Step S146, the tone-correction-data generation unit 36b executes the process of S141.

When the tone-correction-data generation unit 36b determines that the wavelength having not been yet targeted does not exist at Step S146, the tone-correction-data generation unit 36b obtains a representative value of magenta central (Mg) by multiplying T (Mg, λ) obtained at Step S145 by the magenta coefficient 35h stored in the storage unit 35 for each wavelength, and then obtaining the average, similarly to the process of S127 (Step S147).

Figure 15:
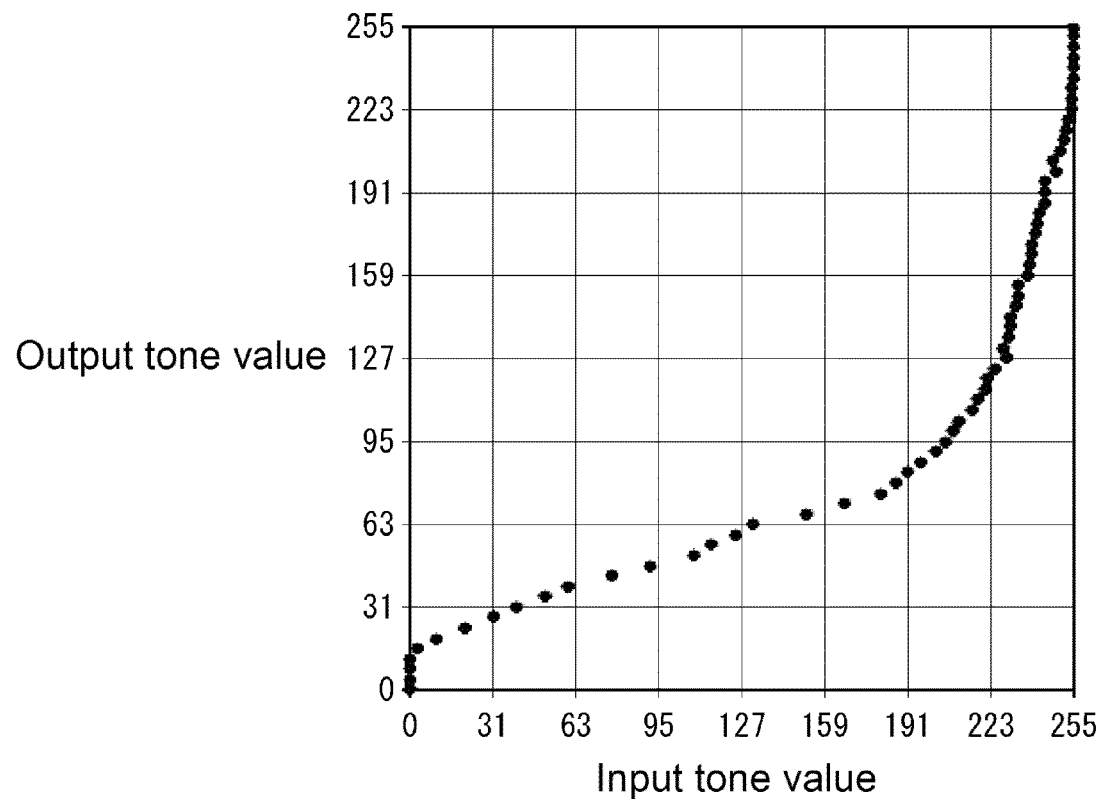
FIG. 15 is a graph illustrating a central (Mg) generated in the process illustrated in FIG. 13.

FIG. 15 illustrates a central (Mg) generated at Step S147.

As illustrated in FIG. 15, the central (Mg) generated by the process of S147 is configured by the representative values of 64 tones indicating the output tone value relative to the input tone value.

As illustrated in FIG. 13, the tone-correction-data generation unit 36b, after the process of S147, generates the magenta-gamma correction table 35d by increasing the representative values of 64 points of the central (Mg) to 256 points, similarly to the process of S128 (Step S148).

The tone-correction-data generation unit 36b, after the process of S148, causes the magenta-gamma correction table 35d generated at Step S148 to be stored in the storage unit 35 (Step S149) and terminates the generation process of the magenta-gamma correction table illustrated in FIG. 13.

As illustrated in FIG. 4, the tone-correction-data generation unit 36b executes a generation process of the yellow-gamma correction table for generating the yellow-gamma correction table 35e (Step S115) when the generation process of the magenta-gamma correction table at Step S114 is terminated (Step S115).

Figure 16:
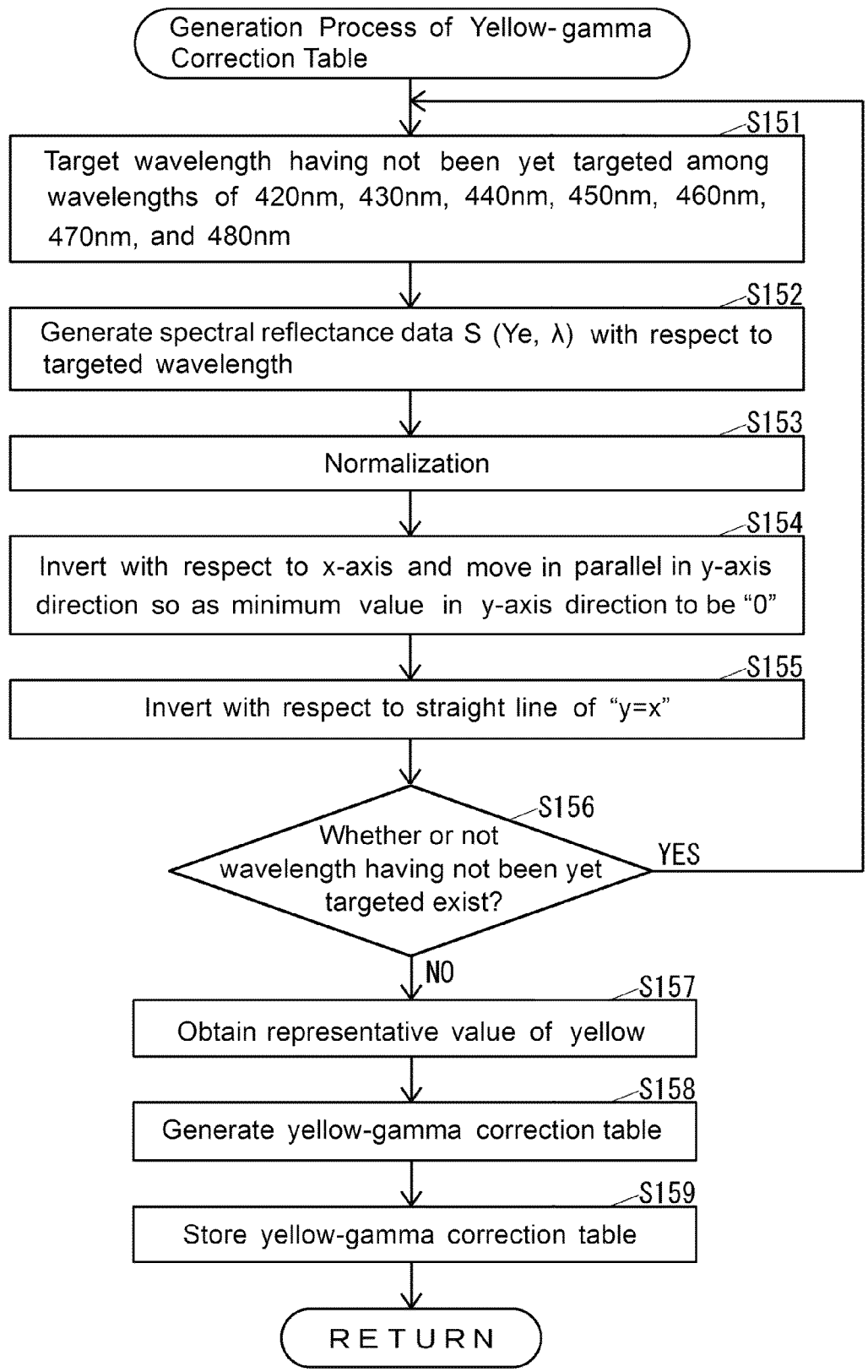
FIG. 16 a flowchart of a generation process of a yellow-gamma correction table illustrated in FIG. 4.

FIG. 16 is a flowchart of the generation process of the yellow-gamma correction table illustrated in FIG. 4.

As illustrated in FIG. 16, the tone-correction-data generation unit 36b targets the wavelength having not been yet targeted among the wavelengths of 420 nm, 430 nm, 440 nm, 450 nm, 460 nm, 470 nm, and 480 nm used for the generation of the yellow-gamma correction table 35e in the range of wavelengths of above-described 420 nm to 480 nm (Step S151).

Figure 17A:
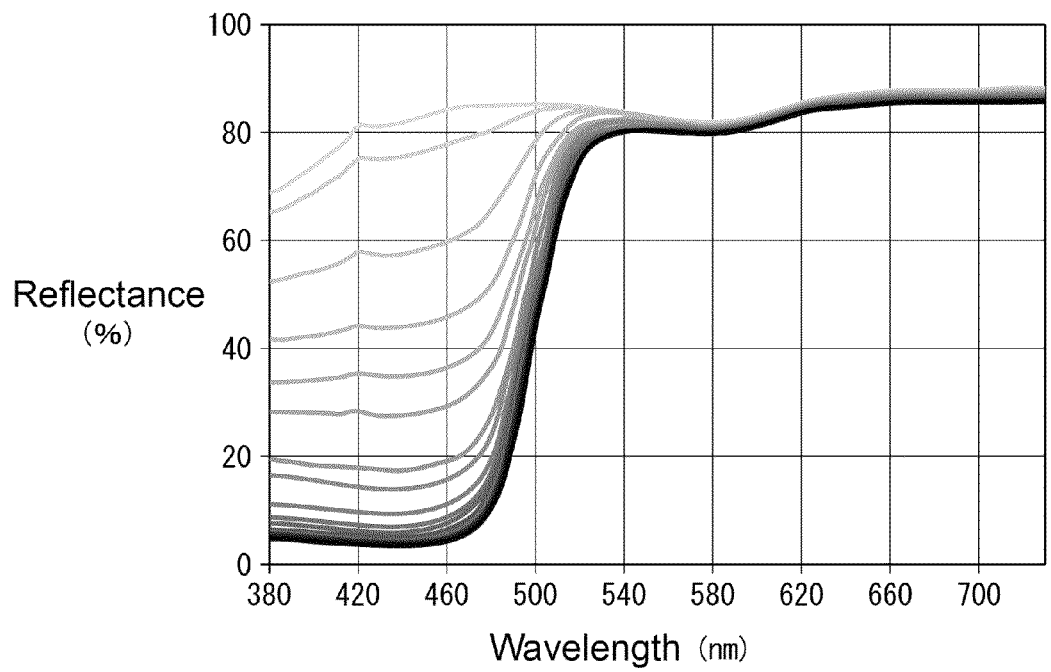
FIG. 17A is a graph illustrating the spectral reflectances of 16 tones worth among the spectral reflectances of yellow averaged in the process illustrated in FIG. 4.

FIG. 17A illustrates the spectral reflectances of 16 tones worth among the spectral reflectances of yellow averaged at Step S111.

Though the spectral reflectances of yellow averaged at Step S111 are 64 tones worth, only the spectral reflectances of 16 tones worth, which are indicated by the tone values of 15, 31, 47, 63, 79, 95, 111, 127, 143, 159, 175, 191, 207, 223, 239, and 255 among the spectral reflectances of 64 tones worth, are illustrated in FIG. 17A so as to improve visibility. In FIG. 17A, the spectral reflectance with larger tone value is illustrated by a darker line of print density.

As illustrated in FIG. 17A, the range of wavelengths of 420 nm to 480 nm is the range where the change of spectral reflectance relative to the change of the tone of yellow is large compared with, for example, the range of the wavelengths of 500 nm to 730 nm.

The tone-correction-data generation unit 36b, after the process of S151, generates the spectral reflectance data S (Ye, λ) indicating the spectral reflectance relative to the tone value with respect to the current targeted wavelength, in the spectral reflectances of yellow averaged at Step S111 (Step S152).

Figure 17B:
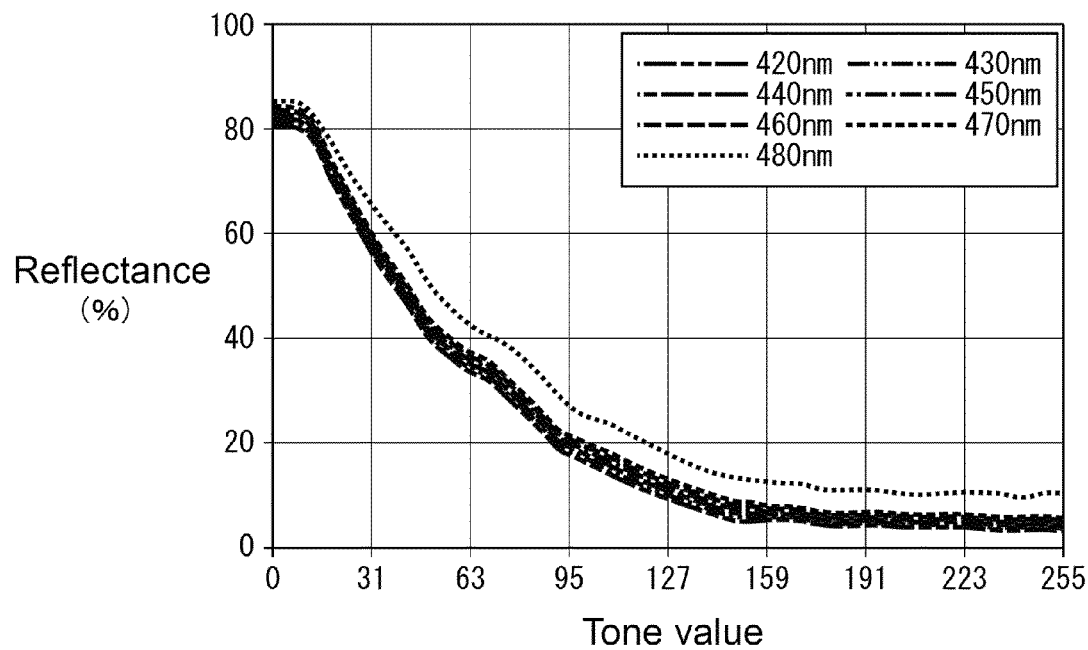
FIG. 17B is a graph illustrating a spectral reflectance S (Ye, λ) generated in the process illustrated in FIG. 16.

FIG. 17B illustrates the spectral reflectance data S (Ye, λ) generated at Step S152.

In FIG. 17B, the spectral reflectance data S (Ye, 420 nm), the spectral reflectance data S (Ye, 430 nm), the spectral reflectance data S (Ye, 440 nm), the spectral reflectance data S (Ye, 450 nm), the spectral reflectance data S (Ye, 460 nm), the spectral reflectance data S (Ye, 470 nm), and the spectral reflectance data S (Ye, 480 nm) are illustrated. Though a graph illustrated in FIG. 17B is drawn as a continuous line, in practice, the graph is the set of points of 64 tones worth used in the process.

As illustrated in FIG. 16, the tone-correction-data generation unit 36b, after the process of S152, executes the process of S153 similarly to the process of S123, using the maximum spectral reflectance ref (Ye, max) and the minimum spectral reflectance ref (Ye, min) in the targeted tone characteristics of yellow in the printer 33.

Next, the tone-correction-data generation unit 36b executes the processes of S154 and S155, similarly to the processes of S124 and S125.

The tone-correction-data generation unit 36b, after the process of S155, determines whether or not the wavelength, which has not been yet targeted, exists among the wavelengths of 420 nm, 430 nm, 440 nm, 450 nm, 460 nm, 470 nm, and 480 nm (Step S156).

When the tone-correction-data generation unit 36b determines that the wavelength having not been yet targeted exists at Step S156, the tone-correction-data generation unit 36b executes the process of S151.

When the tone-correction-data generation unit 36b determines that the wavelength having not been yet targeted does not exist at Step S156, the tone-correction-data generation unit 36b obtains a representative value of yellow central (Ye) by multiplying T (Ye, λ) obtained at Step S155 by the yellow coefficient 35i stored in the storage unit 35 for each wavelength, and then obtaining the average, similarly to the process of S127 (Step S157).

Figure 18:
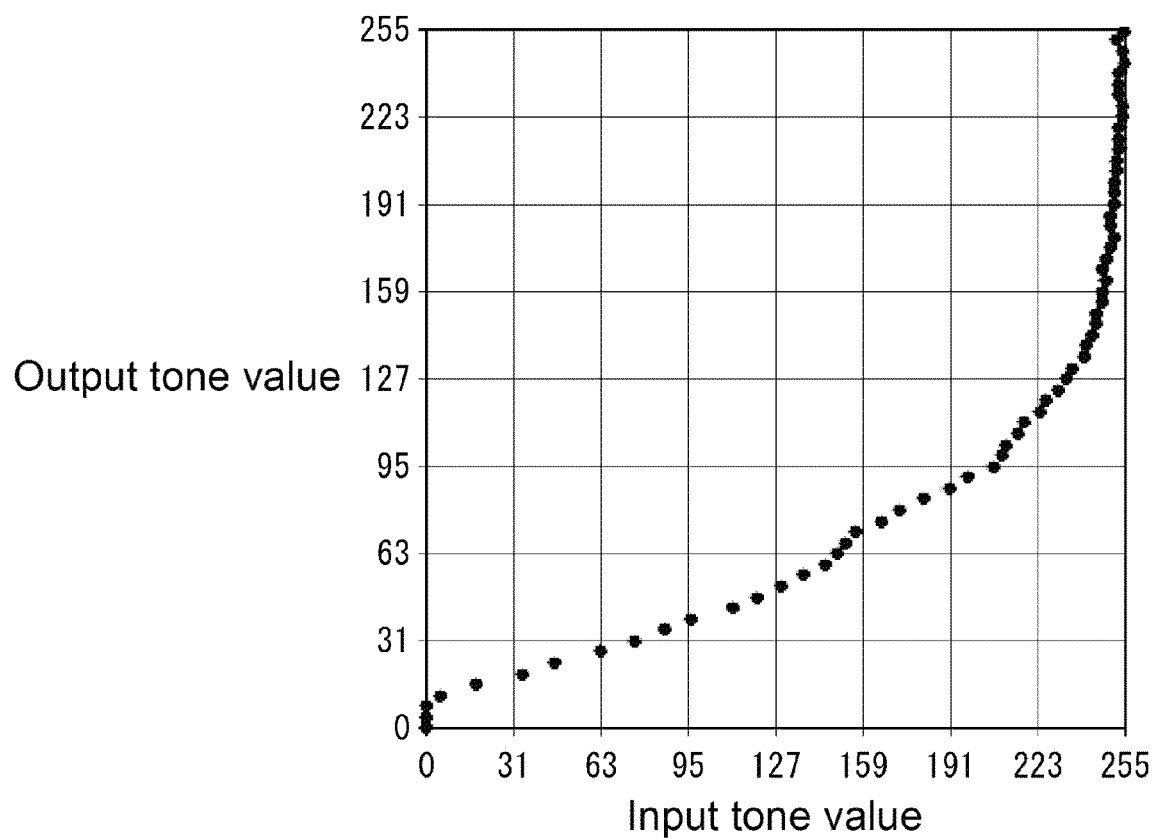
FIG. 18 is a graph illustrating a central (Ye) generated in the process illustrated in FIG. 16.

FIG. 18 illustrates a central (Ye) generated at Step S157.

As illustrated in FIG. 18, the central (Ye) generated by the process of S157 is configured by the representative values of 64 tones indicating the output tone value relative to the input tone value.

As illustrated in FIG. 16, the tone-correction-data generation unit 36b, after the process of S157, generates the yellow-gamma correction table 35e by increasing the representative values of 64 points of the central (Ye) to 256 points, similarly to the process of S128 (Step S158).

The tone-correction-data generation unit 36b, after the process of S158, causes the yellow-gamma correction table 35e generated at Step S158 to be stored in the storage unit 35 (Step S159) and terminates the generation process of the yellow-gamma correction table illustrated in FIG. 16.

As illustrated in FIG. 4, the tone-correction-data generation unit 36b terminates the generation process of the gamma correction table illustrated in FIG. 4 when the generation process of the yellow-gamma correction table at Step S115 terminates.

As illustrated in FIG. 3, when the generation process of the gamma correction table at Step S103 is terminated, the control unit 36 applies the black-gamma correction table 35b, the cyan-gamma correction table 35c, the magenta-gamma correction table 35d, and the yellow-gamma correction table 35e, which are stored in the storage unit 35, to the printer 33 (Step S104) and terminates the operation illustrated in FIG. 3. Accordingly, the tone characteristics of black, cyan, magenta, and yellow in the printer 33 each become identical tone characteristics with the targeted tone characteristics, or tone characteristics close to the targeted tone characteristics.

As described above, the printer-only machine 30 can generate the black-gamma correction table 35b, the cyan-gamma correction table 35c, the magenta-gamma correction table 35d, and the yellow-gamma correction table 35e based on the spectral reflectances over the ranges of specified portions of wavelengths suited to the generation of the black-gamma correction table 35b, the cyan-gamma correction table 35c, the magenta-gamma correction table 35d, and the yellow-gamma correction table 35e, among the range of all of the wavelengths measured by the measuring device 20 (Steps S121 to S128, S131 to S138, S141 to S148, S151 to S158). Thus, the printer-only machine 30 can reduce the load for the generation of the black-gamma correction table 35b, the cyan-gamma correction table 35c, the magenta-gamma correction table 35d, and the yellow-gamma correction table 35e.

In the printer-only machine 30, the range of wavelengths used for the generation of the black-gamma correction table 35b, the cyan-gamma correction table 35c, the magenta-gamma correction table 35d, and the yellow-gamma correction table 35e is the range where the change of the spectral reflectance is large relative to the change of the color tone, compared with, among the range of all of the wavelengths measured by the measuring device 20, at least the ranges of portions, as illustrated in FIG. 6A, FIG. 6B, FIG. 11A, FIG. 11B, FIG. 14A, FIG. 14B, FIG. 17A, and FIG. 17B. With this configuration, the printer-only machine 30 can generate the black-gamma correction table 35b, the cyan-gamma correction table 35c, the magenta-gamma correction table 35d, and the yellow-gamma correction table 35e based on the spectral reflectances in the range of wavelengths where the change of the spectral reflectance is larger relative to the change of the color tone. Thus, while reducing the load for the generation of the black-gamma correction table 35b, the cyan-gamma correction table 35c, the magenta-gamma correction table 35d, and the yellow-gamma correction table 35e, the printer-only machine 30 can generate appropriate black-gamma correction table 35b, cyan-gamma correction table 35c, magenta-gamma correction table 35d, and yellow-gamma correction table 35e.

In the printer-only machine 30, the ranges of wavelengths for the generation of the black-gamma correction table 35b, the cyan-gamma correction table 35c, the magenta-gamma correction table 35d, and the yellow-gamma correction table 35e are different with respect to black and magenta, cyan, and yellow (Steps S121 to S128, S131 to S138, S141 to S148, S151 to S158). With this configuration, the printer-only machine 30 can generate the black-gamma correction table 35b, the cyan-gamma correction table 35c, the magenta-gamma correction table 35d, and the yellow-gamma correction table 35e based on the spectral reflectances over the ranges of specified portions of wavelengths suited to each of black, cyan, magenta, and yellow, among the range of all of the wavelengths measured by the measuring device 20. Thus, while reducing the load for the generation of the black-gamma correction table 35b, the cyan-gamma correction table 35c, the magenta-gamma correction table 35d, and the yellow-gamma correction table 35e, the printer-only machine 30 can generate appropriate black-gamma correction table 35b, cyan-gamma correction table 35c, magenta-gamma correction table 35d, and yellow-gamma correction table 35e.

While the printer-only machine 30 includes the measuring device 20 outside in the embodiment, the printer-only machine 30 may incorporate the measuring device 20 as part of the configuration of the printer-only machine 30 itself.

While the image forming apparatus of the disclosure is the printer-only machine in the embodiment, an image forming apparatus other than the printer-only machine, for example, such as a MFP, a copy-only machine, and a FAX-only machine, may be applicable.

Though an electronic device of the disclosure is the printer-only machine, an electronic device other than the printer-only machine, for example, such as a PC, may be applicable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus communicatively connectable to a spectral-reflectance measuring device, the image forming apparatus comprising:
a print device that prints a chart including patches of a plurality of tones of color;
a storage unit that stores a black-gamma correction table as tone-correction data for correction of tone characteristics of the print device with regard to black, a cyan-gamma correction table as tone-correction data for correction of tone characteristics of the print device with regard to cyan, a magenta-gamma correction table as tone-correction data for correction of tone characteristics of the print device with regard to magenta, a yellow-gamma correction table as tone-correction data for correction of tone characteristics of the print device with regard to yellow, a black coefficient for generation of the black-gamma correction table, a cyan coefficient for generation of the cyan-gamma correction table, a magenta coefficient for generation of the magenta-gamma correction table, and a yellow coefficient for generation of the yellow-gamma correction table;
a spectral reflectance acquiring unit that acquires a range of spectral reflectances measured by the spectral-reflectance measuring device from the patches in the chart printed by the print device; and
a tone-correction-data generation unit that generates the tone-correction data for correction of the tone characteristics of the print device, based on, among the spectral reflectances over the range of all of the wavelengths at which they are acquired by the spectral reflectance acquiring unit, the spectral reflectances over the range of specified portions of the wavelengths; wherein the ranges of specified portions of the wavelengths are ranges in which change in spectral reflectance relative to change in color tone is large compared with, among the range of all of the wavelengths, at least the range of a portion, based on a color matching function y(λ) in a XYZ colorimetric system, and a spectral distribution R(λ) for a light source in the measuring device, a coefficient rev(Bk, λ) as the black coefficient is expressed by the formula $$rev(Bk, \lambda) = \frac{y(\lambda) \times R(\lambda)}{\max[y(\lambda_a) \times R(\lambda_a)]} \quad \text{Formula 1}$$

where λ and $\lambda_a$ denote wavelength and range from 520 nm to 580 nm in Formula 1,
based on a color matching function x(λ) in the XYZ colorimetric system, and the spectral distribution R(λ) for the light source in the measuring device, a coefficient rev(Cy, λ) as the cyan coefficient is expressed by the formula $$rev(Cy, \lambda) = \frac{x(\lambda) \times R(\lambda)}{\max[x(\lambda_a) \times R(\lambda_a)]} \quad \text{Formula 2}$$

where λ and $\lambda_a$ denote wavelength and range from 570 nm to 630 nm in Formula 2,
based on a color matching function y(λ) in the XYZ colorimetric system, and the spectral distribution R(λ) for the light source in the measuring device, a coefficient rev(Mg, λ) as the magenta coefficient is expressed by the formula $$rev(Mg, \lambda) = \frac{y(\lambda) \times R(\lambda)}{\max[y(\lambda_a) \times R(\lambda_a)]} \quad \text{Formula 3}$$

where λ and $\lambda_a$ denote wavelength and range from 520 nm to 580 nm in Formula 3, and
based on a color matching function z(λ) in the XYZ colorimetric system, and the spectral distribution R(λ) for the light source in the measuring device, a coefficient rev(Ye, λ) as the yellow coefficient is expressed by the formula $$rev(Ye, \lambda) = \frac{z(\lambda) \times R(\lambda)}{\max[z(\lambda_a) \times R(\lambda_a)]} \quad \text{Formula 4}$$

where λ and $\lambda_a$ denote wavelength and range from 420 nm to 480 nm in Formula 4.

2. A non-transitory computer-readable recording medium storing a calibration program for an image forming apparatus communicatively connectable to a spectral-reflectance measuring device, the image forming apparatus including a print device that prints a chart including patches of a plurality of tones of color, and a storage unit that stores a black-gamma correction table as tone-correction data for correction of tone characteristics of the print device with regard to black, a cyan-gamma correction table as tone-correction data for correction of tone characteristics of the print device with regard to cyan, a magenta-gamma correction table as tone-correction data for correction of tone characteristics of the print device with regard to magenta, a yellow-gamma correction table as tone-correction data for correction of tone characteristics of the print device with regard to yellow, a black coefficient used for generation of the black-gamma correction table, a cyan coefficient used for generation of the cyan-gamma correction table, a magenta coefficient used for generation of the magenta-gamma correction table, and a yellow coefficient used for generation of the yellow-gamma correction table, the calibration program causing the image forming apparatus to function as:
  a spectral reflectance acquiring unit that acquires a range of spectral reflectances measured by the spectral-reflectance measuring device from the patches in the chart printed by the print device; and
  a tone-correction-data generation unit that generates the tone-correction data for the correction of tone characteristics of the print device, based on, among the spectral reflectances over the range of all of the wavelengths at which they are acquired by the spectral reflectance acquiring unit, the spectral reflectances over the range of specified portions of the wavelengths; wherein
  the ranges of specified portions of the wavelengths are ranges in which change in spectral reflectance relative to change in color tone is large compared with, among the range of all of the wavelengths, at least the range of a portion,
  based on a color matching function y(λ) in a XYZ colorimetric system, and a spectral distribution R(λ) for a light source in the measuring device, a coefficient rev(Bk, λ) as the black coefficient is expressed by the formula $$rev(Bk, \lambda) = \frac{y(\lambda) \times R(\lambda)}{\max[y(\lambda_a) \times R(\lambda_a)]} \quad \text{Formula 1}$$

where λ and $\lambda_a$ denote wavelength and range from 520 nm to 580 nm in Formula 1,
  based on a color matching function x(λ) in the XYZ colorimetric system, and the spectral distribution R(λ) for the light source in the measuring device, a coefficient rev(Cv, λ) as the cyan coefficient is expressed by the formula $$rev(Cy, \lambda) = \frac{x(\lambda) \times R(\lambda)}{\max[x(\lambda_a) \times R(\lambda_a)]} \quad \text{Formula 2}$$

where λ and $\lambda_a$ denote wavelength and range from 570 nm to 630 nm in Formula 2,
  based on a color matching function y(λ) in the XYZ colorimetric system, and the spectral distribution R(λ) for the light source in the measuring device, a coefficient rev(Mg, λ) as the magenta coefficient is expressed by the formula $$rev(Mg, \lambda) = \frac{y(\lambda) \times R(\lambda)}{\max[y(\lambda_a) \times R(\lambda_a)]} \quad \text{Formula 3}$$

where λ and $\lambda_a$ denote wavelength and range from 520 nm to 580 nm in Formula 3, and
  based on a color matching function z(λ) in the XYZ colorimetric system, and the spectral distribution R(λ) for the light source in the measuring device, a coefficient rev(Ye, λ) as the yellow coefficient is expressed by the formula $$rev(Ye, \lambda) = \frac{z(\lambda) \times R(\lambda)}{\max[z(\lambda_a) \times R(\lambda_a)]} \quad \text{Formula 4}$$

where λ and $\lambda_a$ denote wavelength and range from 420 nm to 480 nm in Formula 4.

3. A calibration method for an image forming apparatus communicatively connectable to a spectral-reflectance measuring device and including a printing device and a storage unit, the calibration method comprising:
  printing, via the printing device, a chart including patches of a plurality of tones of color;
  storing, via the storing unit a black-gamma correction table as tone-correction data for correction of tone characteristics of the print device with regard to black, a cyan-gamma correction table as tone-correction data for correction of tone characteristics of the print device with regard to cyan, a magenta-gamma correction table as tone-correction data for correction of tone characteristics of the print device with regard to magenta, a yellow-gamma correction table as tone-correction data for correction of tone characteristics of the print device with regard to yellow, a black coefficient for generation of the black-gamma correction table, a cyan coefficient for generation of the cyan-gamma correction table, a magenta coefficient for generation of the magenta-gamma correction table, and a yellow coefficient for generation of the yellow-gamma correction table;
  acquiring a range of spectral reflectances measured by the spectral-reflectance measuring device from the patches in the chart printed by the print device; and
  generating the tone-correction data for correction of the tone characteristics of the print device, based on, among the spectral reflectances over the range of all of the wavelengths at which they are acquired, the spectral reflectances over the range of specified portions of the wavelengths; wherein
  the ranges of specified portions of the wavelengths are ranges in which change in spectral reflectance relative to change in color tone is large compared with, among the range of all of the wavelengths, at least the range of a portion
  based on a color matching function y(λ) in a XYZ colorimetric system, and a spectral distribution R(λ) for a light source in the measuring device, a coefficient rev(Bk, λ) as the black coefficient is expressed by the formula $$rev(Bk, \lambda) = \frac{y(\lambda) \times R(\lambda)}{\max[y(\lambda_a) \times R(\lambda_a)]} \quad \text{Formula 1}$$

where λ and $\lambda_a$ denote wavelength and range from 520 nm to 580 nm in Formula 1,
  based on a color matching function x(λ) in the XYZ colorimetric system, and the spectral distribution R(λ) for the light source in the measuring device, a coefficient rev(Cv, λ) as the cyan coefficient is expressed by the formula $$rev(Cy, \lambda) = \frac{x(\lambda) \times R(\lambda)}{\max[x(\lambda_a) \times R(\lambda_a)]} \quad \text{Formula 2}$$

where λ and $\lambda_a$ denote wavelength and range from 570 nm to 630 nm in Formula 2, based on a color matching function y(λ) in the XYZ colorimetric system, and the spectral distribution R(λ) for the light source in the measuring device, a coefficient rev(Mg, λ) as the magenta coefficient is expressed by the formula $$rev(Mg, \lambda) = \frac{y(\lambda) \times R(\lambda)}{\max[y(\lambda_a) \times R(\lambda_a)]} \quad \text{Formula 3}$$

where λ and $\lambda_a$ denote wavelength and range from 520 nm to 580 nm in Formula 3, and based on a color matching function z(λ) in the XYZ colorimetric system, and the spectral distribution R(λ) for the light source in the measuring device, a coefficient rev(Ye, λ) as the yellow coefficient is expressed by the formula $$rev(Ye, \lambda) = \frac{z(\lambda) \times R(\lambda)}{\max[z(\lambda_a) \times R(\lambda_a)]} \quad \text{Formula 4}$$

where λ and $\lambda_a$ denote wavelength and range from 420 nm to 480 nm in Formula 4.

4. The image forming apparatus according to claim 1, wherein the storage unit includes:
- black coefficients of seven kinds given by λ being 520 nm, 530 nm, 540 nm, 550 nm, 560 nm, 570 nm and 580 nm;
- cyan coefficients of seven kinds given by λ being 570 nm, 580 nm, 590 nm, 600 nm, 610 nm, 620 nm, and 630 nm;
- magenta coefficients of seven kinds given by λ being 520 nm, 530 nm, 540 nm, 550 nm, 560 nm, 570 nm, and 580 nm; and
- yellow coefficients of seven kinds given by λ being 420 nm, 430 nm, 440 nm, 450 nm, 460 nm, 470 nm, and 480 nm.

5. The non-transitory computer-readable recording medium according to claim 2, wherein the storage unit includes:
- black coefficients of seven kinds given by λ being 520 nm, 530 nm, 540 nm, 550 nm, 560 nm, 570 nm and 580 nm;
- cyan coefficients of seven kinds given by λ being 570 nm, 580 nm, 590 nm, 600 nm, 610 nm, 620 nm, and 630 nm;
- magenta coefficients of seven kinds given by λ being 520 nm, 530 nm, 540 nm, 550 nm, 560 nm, 570 nm, and 580 nm; and
- yellow coefficients of seven kinds given by λ being 420 nm, 430 nm, 440 nm, 450 nm, 460 nm, 470 nm, and 480 nm.

6. The image forming method according to claim 3, wherein the storage unit includes:
- black coefficients of seven kinds given by λ being 520 nm, 530 nm, 540 nm, 550 nm, 560 nm, 570 nm and 580 nm;
- cyan coefficients of seven kinds given by λ being 570 nm, 580 nm, 590 nm, 600 nm, 610 nm, 620 nm, and 630 nm;
- magenta coefficients of seven kinds given by λ being 520 nm, 530 nm, 540 nm, 550 nm, 560 nm, 570 nm, and 580 nm; and
- yellow coefficients of seven kinds given by λ being 420 nm, 430 nm, 440 nm, 450 nm, 460 nm, 470 nm, and 480 nm.

* * * * *